(12) United States Patent
Cidon

(10) Patent No.: US 8,527,549 B2
(45) Date of Patent: Sep. 3, 2013

(54) CLOUD BASED OPERATING AND VIRTUAL FILE SYSTEM

(75) Inventor: Asaf Cidon, Stanford, CA (US)

(73) Assignee: Sookasa Inc., Mountain View ( * ) Notice: Subject to any disclaimer, the term of this patent is extended or adjusted under 35 U.S.C. 154(b) by 270 days.

(21) Appl. No.: 13/031,628

(22) Filed: Feb. 22, 2011

(65) Prior Publication Data

US 2011/0252071 A1    Oct. 13, 2011

Related U.S. Application Data

(60) Provisional application No. 61/306,578, filed on Feb. 22, 2010.

(51) Int. Cl.
*G06F 7/00*  (2006.01)
*G06F 17/30*  (2006.01)

(52) U.S. Cl.
USPC ......................................................... 707/802

(58) Field of Classification Search
None
See application file for complete search history.

(56) References Cited

U.S. PATENT DOCUMENTS

| | | | |
|---|---|---|---|
| 5,987,506 A * | 11/1999 | Carter et al. | 709/213 |
| 2006/0259184 A1 * | 11/2006 | Hayes et al. | 700/221 |
| 2010/0191774 A1 * | 7/2010 | Mason et al. | 707/797 |

OTHER PUBLICATIONS

Aymerich et al, "An Approach to a Cloud Computing Network", IEEE 2008, 6 pages.*

* cited by examiner

*Primary Examiner* — Uyen Le
(74) *Attorney, Agent, or Firm* — Oren Reches

(57) ABSTRACT

A method for managing a virtual distributed file system includes maintaining by a master device located in a cloud computing environment, a metadata data structure that stores metadata about locations of most updated versions of multiple file portions and security levels of the file portions, at least one file portion being stored at a user device coupled to the cloud computing environment, and maintaining by the master device, transaction of file portions to user entities, at least one user entity being hosted by the user device, based on at least metadata stored in the metadata data structure about the file portions.

32 Claims, 13 Drawing Sheets

Individual File Index

| Key | File path and file name |
|---|---|
| Lock | Flags associated with file read and write consistency |
| File Type | File type |
| Chunk Array | List of all chunks in file (SHA-1 keys) |
| Security Policy ID | Security policy ID |
| Backup Policy ID | Backup Policy ID |
| Access Control List | List of user groups, specific users and assets that can access the file |
| Agent File Map | Key: Agent ID<br>Values: POSIX time stamp, file size, valid bit |
| Additional Optional Entries | Email metadata: MIME data, email subject, sender and destination fields<br>Picture metadata: people tags, picture resolution, color information |

Network Status Table

| Agent ID | Network ID | IP Address, NAT, TCP/UDP ports | Average Upload Bandwidth | Average Download Bandwidth | Latency | Network State | Waiting Message |
|---|---|---|---|---|---|---|---|
| smartphone-user | WiFi1-name | 102.2.2.43 UDP-5341 TCP-4444 | 45 KB/s | 83 KB/s | 40 ms | idle | Update /asset-root/file 1 |
| Laptop e-user | Intranet - name | | | | | disconnected | Update /asset-root/file 1 |
| gmail-account-name | Internet | 22.38.31.6 UDP-7641 TCP-2154 | 300 KB/s | 1 MB/s | 100 ms | active | |

Chunk Table

| File | Chunk List (signature and pointers) |
|---|---|
| /asset-root/file1 | <chunk 3, chunk 53, chunk 236, ...> |
| /asset-root/dir1/file2 | <chunk 2, chunk 53, chunk 5807, ...> |

Chunk Availability Table

| Chunk ID | Chunk List |
|---|---|
| 3 | <local location, asset1, asset3, , ...> |
| 5807 | <local location, asset7, ...> |

CLOUD BASED OPERATING AND VIRTUAL FILE SYSTEM

RELATED APPLICATIONS

This patent application claims priority from U.S. provisional patent Ser. No. 61/306,578 filing date Feb. 22, 2010, being incorporated herein by reference by its entirety.

BACKGROUND OF THE INVENTION

More and more Internet-enabled devices are finding their way into the workplace. These devices may include but are not limited to mobile (as well as stationary) devices. Non-limiting examples of such devices may include smart-phones, tablets and notebooks.

Employee data may be scattered among company infrastructure, mobile devices, mobile memory and web service accounts.

Mobile applications with distributed data may pose new challenges to enterprise IT. These challenges can include at least some of the following: (i) data accessibility and sharing challenges (for example—how can content created on various platforms be instantly accessible by geographically dispersed employees and how can this data be shared); (ii) data control challenges (for example—how can IT track and manage dispersed data and how to perform transparent backups across mobile devices); (iii) data security challenges (for example—how to prevent data theft, leaks and intermixing with personal data); (iv) communication and storage costs challenges (for example—cellular networks expensive for massive data transfers—control of costs, or how much can existing enterprise investments in storage and networks be leveraged).

Simultaneously, a wide-array of computerized sophisticated multi-functional portable devices and gadgets have entered the consumer market. Examples include smart-phones, tablets, video and still cameras, audio and video players, portable game consoles, GPS navigators, PDAs, laptops. Homes are widely being networked, mainly via wireless home networks (such as WiFi and WiMax). Many devices can be connected today directly to the home network, and from there to the external Internet. Other devices, using Bluetooth or other local wireless and wired connections, are connected to the global Internet through other devices. Similarly, portable devices are also becoming constantly connected, through public cellular and wireless infrastructure. Furthermore, devices that are not linked directly to the Internet have the ability to connect through local networks to Internet-connected devices. However, despite the fact that a growing number of these devices have constant internet connectivity, there is no interoperability between any of these devices, or between them and the home computer. Applications developed on a single device utilize the capabilities of another device effectively.

SUMMARY OF THE INVENTION

A method for operating a web-based operating system, the method comprises: maintaining, by a master server located in a cloud computing environment, a metadata data structure that comprises metadata that comprises state information about states of multiple assets of at least one user; and running applications, by the master server, across multiple assets; wherein a running of an application comprises: communicating with multiple assets that are coupled to the cloud computing environment or are hosted by a device that is either coupled to the cloud computing environment or belongs to the cloud computing environment; and managing a state of at least a first asset according to (a) metadata of the metadata data structure that is associated with the first asset and (b) at least one of (b.i) metadata of the metadata data structure associated with a second asset and (b.ii) application related external information.

The asset is selected from a group consisting of a smart phone, a mobile phone, a tablet, a laptop, a desktop, a personal data accessory, a camera, a television, a home entertainment device, a home gaming device, a home appliance, a home security system, fire control systems, a home irrigation system, home lighting control, a climate control system, a water heating system, an electrical control device, a movement sensor, a heat sensor, a personal web account, an email account, a user on-line calendar, a user on-line contact list, a social network account, a web document account, a user health account, a software as a service account, an enterprise internal file system, a user related storage at the master center and a user profile account at the master center.

The application related external information is selected from a group consisting of area weather conditions, area light condition, area visibility conditions, area online maps, area traffic conditions, asset maintenance and repair information, vendor information associated with operation and software update, information associated with asset remote control and monitoring capabilities, asset related commercial offerings, related advertising information, public location based services, information provided by emergency forces and local news information.

The method may include using a first asset as a remote control for at least one other asset; wherein the method comprises sending to the master server the first asset's state information that comprises commands and changing, by the master server, a state of other assets in response to the commands.

The managing of the state of assets comprises transferring information through a direct network connection from a first asset to one or more other assets.

A method for managing a virtual distributed file system, the method comprising: maintaining, by a master server located in a cloud computing environment, a metadata data structure that comprises metadata that comprises locations of the most updated versions of multiple files and directories; wherein at least one file or directory is rooted at a user device that is coupled to the cloud computing environment; and managing, by the master server, transaction of file portions between user assets based on metadata stored in the metadata data structure about the file and directory.

At least one user asset is selected from a group comprising a smart phone, a mobile phone, a tablet, a laptop, a desktop, a personal data accessory, a home entertainment device, a home gaming device, a home appliance, a portable memory device, a personal web account, an email account, a social network account, a web storage, a network backup storage, a web document account, a software as a service account, an enterprise internal file system, an enterprise application account and file storage located at the master server.

The metadata of the file includes a description of a native file system of an asset on which the said file resides, a name of the asset, a type of the asset, an identity and structure of a directory for which the file belongs, absolute or relative location of the file in the directory, a time of a last change of the file, a file version number, a file description, a file encryption key, a list of file chunks composing the file, a position of the file chunks in the file.

The user asset stores at least a part of the metadata data structure that is associated with the user; wherein the method comprises synchronizing at least part of the metadata structure associated with the user with the master server upon local and remote file and directory metadata changes.

The method may include receiving a request to transfer a file to a first asset; determining at least one other asset from which missing file chunks are to be transferred based upon network connectivity metadata, indicative of a quality of communication between the first asset and at least one other asset.

The method may include receiving a request to transfer a file from a first asset to a second asset; determining whether the file should be transferred through the master server or not, based upon network connectivity metadata, indicative of an available direct communication between the first and second assets.

At least one asset is an account of a user in a remote web service and wherein the metadata data structure comprises metadata about files accessible through the web account of the user, wherein the metadata structure comprises a representation of files accessible through the web account of the user in a form of a virtual file directory structure.

At least one directory of the virtual directory structure describes an email account of a user, wherein the virtual file directory structure comprises metadata of at least one email attachment, wherein the metadata associated with said attachment includes the standard fields of the email message.

The method may include instructing a first user asset to fetch at least one file chunk from the master server or another user asset in a response to an indication that the first user asset network connectivity has changed.

The method may include instructing a first user asset to send to another user asset or to the master server at least one file chunk in a response to an indication that the first user asset network connectivity has changed.

The method may include instructing a first user asset to fetch at least one file chunk of a recently updated file from the master server or another user asset in a response to a recent file update and according to the first user asset's network connectivity speed.

The method according to claim 6, comprising instructing a first user asset to send to another user asset or to the master server at least one file chunk of a recently updated file in a response to a recent file update and according to the first user asset's network connectivity speed.

The method may include instructing a first user asset to fetch at least one file chunk of a recently updated file from the master server or another user asset in a response to a file or directory related command on a second user asset and according to the first user asset's network connectivity speed.

The method may include instructing a first user asset to send to another user asset or to the master server at least one file chunk of a recently updated file in a response to a file or directory related command on a second user asset and according to the first user asset's network connectivity speed.

A computer program product that comprises a non-transitory computer readable medium that stores instructions for: maintaining, by a master server located in a cloud computing environment, a metadata data structure that comprises metadata that comprises state information about a state of multiple assets of at least one user; running applications, by the master server, across multiple assets;
wherein a running of an application comprises: communicating with multiple assets that are coupled to the cloud computing environment or are hosted by a device that is either coupled to the cloud computing environment or belongs to the cloud computing environment; and managing a state of at least a first asset according to (a) metadata of the metadata data structure that is associated with the first asset and (b) at least one of (b.i) metadata of the metadata data structure associated with a second asset and (b.ii) application related external information.

The asset is selected from a group consisting of a smart phone, a mobile phone, a tablet, a laptop, a desktop, a personal data accessory, a camera, a television, a home entertainment device, a home gaming device, a home appliance, a home security system, fire control systems, a home irrigation system, home lighting control, a climate control system, a water heating system, an electrical control device, a movement sensor, a heat sensor, a personal web account, an email account, a user on-line calendar, a user on-line contact list, a social network account, a web document account, a user health account, a software as a service account, an enterprise internal file system, a user related storage at the master center and a user profile account at the master center.

The application related external information is selected from a group consisting of area weather conditions, area light condition, area visibility conditions, area online maps, area traffic conditions, asset maintenance and repair information, vendor information associated with operation and software update, information associated with asset remote control and monitoring capabilities, asset related commercial offerings, related advertising information, public location based services, information provided by emergency forces and local news information.

The computer program product stores instructions for using a first asset as a remote control for at least one other asset; wherein the method comprises sending to the master server the first asset's state information that comprises commands and changing, by the master server, a state of other assets in response to the commands.

The managing of the state of assets comprises transferring information through a direct network connection from a first asset to one or more other assets.

A computer program product that comprises a non-transitory computer readable medium that stores instructions for: maintaining, by a master server located in a cloud computing environment, a metadata data structure that comprises metadata that comprises locations of the most updated versions of multiple files and directories; wherein at least one file or directory is rooted at a user device that is coupled to the cloud computing environment; and managing, by the master server, transaction of file portions between user assets based on metadata stored in the metadata data structure about the file and directory.

The at least one user asset is selected from a group comprising a smart phone, a mobile phone, a tablet, a laptop, a desktop, a personal data accessory, a home entertainment device, a home gaming device, a home appliance, a portable memory device, a personal web account, an email account, a social network account, a web storage, a network backup storage, a web document account, a software as a service account, an enterprise internal file system, an enterprise application account and file storage located at the master server.

The metadata of the file includes a description of a native file system of an asset on which the said file resides, a name of the asset, a type of the asset, an identity and structure of a directory for which the file belongs, absolute or relative location of the file in the directory, a time of a last change of the file, a file version number, a file description, a file encryption key, a list of file chunks composing the file, a position of the file chunks in the file.

The user asset stores at least a part of the metadata data structure that is associated with the user; wherein the method comprises synchronizing at least part of the metadata structure associated with the user with the master server upon local and remote file and directory metadata changes.

The computer program product stores instructions for receiving a request to transfer a file to a first asset; determining at least one other asset from which missing file chunks are to be transferred based upon network connectivity metadata, indicative of a quality of communication between the first asset and at least one other asset.

The computer program product stores instructions for receiving a request to transfer a file from a first asset to a second asset; determining whether the file should be transferred through the master server or not, based upon network connectivity metadata, indicative of an available direct communication between the first and second assets.

The at least one asset is an account of a user in a remote web service and wherein the metadata data structure comprises metadata about files accessible through the web account of the user, wherein the metadata structure comprises a representation of files accessible through the web account of the user in a form of a virtual file directory structure.

The at least one directory of the virtual directory structure describes an email account of a user, wherein the virtual file directory structure comprises metadata of at least one email attachment, wherein the metadata associated with said attachment includes the standard fields of the email message.

The computer program product stores instructions for instructing a first user asset to fetch at least one file chunk from the master server or another user asset in a response to an indication that the first user asset network connectivity has changed.

The computer program product stores instructions for: instructing a first user asset to send to another user asset or to the master server at least one file chunk in a response to an indication that the first user asset network connectivity has changed.

The computer program product stores instructions for instructing a first user asset to fetch at least one file chunk of a recently updated file from the master server or another user asset in a response to a recent file update and according to the first user asset's network connectivity speed.

The computer program product stores instructions for instructing a first user asset to send to another user asset or to the master server at least one file chunk of a recently updated file in a response to a recent file update and according to the first user asset's network connectivity speed.

The computer program product stores instructions for instructing a first user asset to fetch at least one file chunk of a recently updated file from the master server or another user asset in a response to a file or directory related command on a second user asset and according to the first user asset's network connectivity speed.

The computer program product stores instructions for instructing a first user asset to send to another user asset or to the master server at least one file chunk of a recently updated file in a response to a file or directory related command on a second user asset and according to the first user asset's network connectivity speed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates an individual file index, according to an embodiment of the invention;

FIG. 9 illustrates a network status table (NST), according to an embodiment of the invention;

FIG. 10 illustrates a chunk table (CT), according to an embodiment of the invention;

FIG. 11 illustrates a chunk availability table (CAT) according to an embodiment of the invention;

Figure 1:
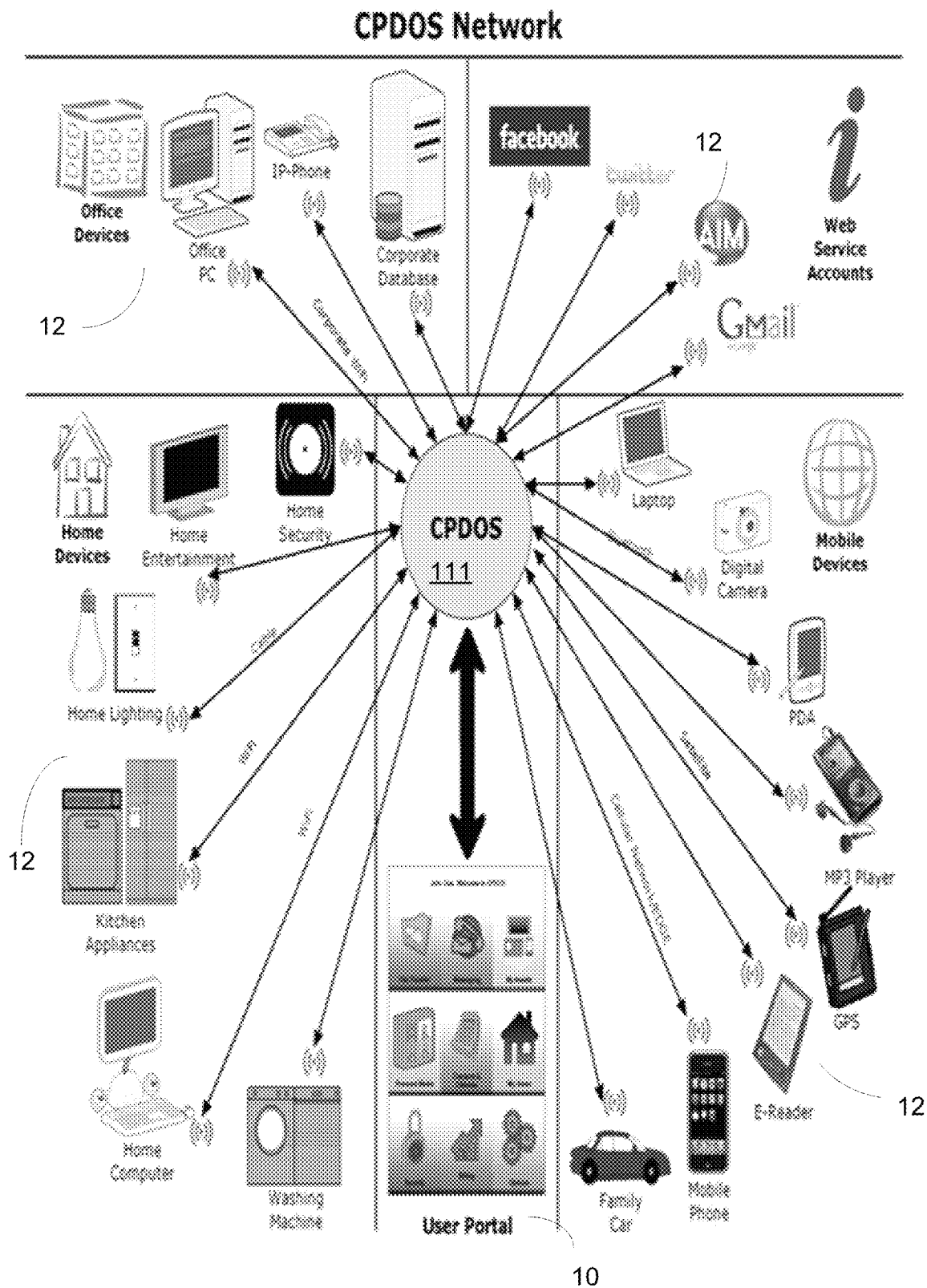
FIG. 1 illustrates various user entities that interact with the CPDOS according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. The Cloud-Based Personal Device Operating System (CPDOS)

To this end, it is provided a web-based platform that will connect all of the user's devices, appliances and web-services. User devices and appliances will "plug-and-play" into a Cloud-based Personal Device Operating System (CPDOS) that is controlled, managed and monitored through a standard, simple, user-friendly interface. CPDOS will be able to connect to the user's choice of personal web accounts as well as public web-services. Programs or tasks will be executed on CPDOS to provide intelligent device applications.

CPDOS will have the same functionality as a PC operating system. External drivers will be provided in order to interact with devices, in the same fashion that Windows uses drivers to connect to a printer or a monitor in a PC. In addition, third-party developers would be able to offer their own software and services on CPDOS. Such services include user-specific information-sharing between a broad-range of devices and control of remote devices through any device with a proper display. In addition, device and appliance vendors will be able to offer consumer-focused content delivery and advertisement based on user preferences, topical activity and user device status. In addition, the continuous connectivity to the user's devices would enable remote repair and maintenance services.

CPDOS will enable the user to remote control his/her devices and home appliances, from a variety of mobile devices (smartphone, laptop, tablet, PDA), without the restrictions of being in the vicinity of the home or the office.

User devices 12 can communicate and interact via a CPDOS. All the user devices 12 and appliances, can execute a web-based operating system. This operating system would store all the information necessary to configure these devices and the user's web-services, and would enable programs to run on the operating system, utilizing the personal data for various applications. These applications could offer remote control and operation, and automatic downloads and uploads of various parameters, information and programs to and from the devices and web-service accounts. The portal would also serve as a main gateway for sharing, translating and transferring data between a wide-array of devices and web-services from different manufacturers and providers, with different standards of information display and access.

FIG. 1 illustrates various user entities 12 that interact with the CPDOS 111 according to an embodiment of the invention. The user entities (also referred to as user assets) may include user devices 12 as well as virtual entities 15 such as email accounts, social network accounts, web accounts and the like.

The CPDOS master 10 may act as a system administrator, or a kernel. It is responsible for allocating and managing the cloud resources, and for communicating with non-user specific entities, such as device vendors, third-party software providers and public websites. It is also responsible for registering new user-specific devices.

Each user is allocated a CPDOS instance, which is associated with user-specific information, applications, devices, appliances and personal online accounts. Since CPDOS was specifically designed to connect between user device, appliances and personal online accounts, such communication goes directly to the corresponding CPDOS instance, without going through the CPDOS Master.

CPDOS Master

The CPDOS Master 10 is responsible for invoking and registering CPDOS instances, and managing their resources and communication with external sources that are not associated with a specific user (e.g. manufacturer driver download site, public weather provider). An important module of the CPDOS Master is the Device Registration Service, which is responsible for assigning devices to specific CPDOS instances.

CPDOS Instances

Each user is allocated an isolated environment, composed of a private instance of an operating system (Cloud-based Personal Device Operating System—CPDOS 111), a user-specific shared memory and storage, a particular set of tasks that run on CPDOS, and device-specific data and interfaces. This creates a virtual machine for each user that connects with all the user's devices and appliances (termed "assets") and private web-services, as well as public web-services and information. This enables user-specific applications to perform useful functions on the user's assets, utilizing public and user-specific information.

Another major module of the CPDOS instance is the Personal User Portal (PUP), which provides the user with a flexible graphical interface to control and monitor her tasks and assets, through any device with a suitable display screen (e.g. PC, laptop, cell-phone, video game console, home appliance, touch screen).

Device Agents, Drivers and Images

In order to enable universal access to CPDOS, assets (such as user devices or virtual user entities) are equipped with a Device Agent (DA), which are software agents that are capable of accessing user-specific CPDOS instances. In the case of online web accounts, it is possible in certain cases to create tailored application that functions similar to a DA (e.g. a Facebook app that accesses CPDOS). In addition to the DA, each device is assigned a Device Image (DI), which contains the various functions and tasks that are associated with the device. Additionally, all of the device's model-specific data (e.g. the device's capabilities, power consumption etc.) and its specific status (e.g. whether the device is currently on or off, the user-defined heating parameters etc.), are stored in the DI. The DA sends messages to the CPDOS cloud that include the asset's identification, status and a specific request. These messages are then processed by a Device Driver (DD), a unique software agent that is responsible for communicating with each device, and runs on CPDOS. The DD then translates the device's requests to CPDOS, or sends back the CPDOS' responses to the DA.

Due to the restrictions of firewalls and web proxies, all the DA communications with CPDOS is accomplished through regular HTTP/HTTPS communication. In order to accommodate two-way communication, DAs may be required by CPDOS to access CPDOS periodically or at specific scheduled times.

A DA request contains the device ID, the device serial number, a user ID, and a request to activate a specific CPDOS function with certain parameters. For each request, the corresponding DD is assigned according to the request identification. The DD receives the request and translates it to a CPDOS readable function. CPDOS then checks whether the request can be fulfilled, by looking up the device's credentials in the corresponding DI, according to the request parameters. If the request has the sufficient credentials, the CPDOS executes the requested task. Tasks may change or update certain user and device parameters or invoke new applications. The response, which may be a new request made by CPDOS to the device, is sent back through the DD to the DA.

Figure 2:
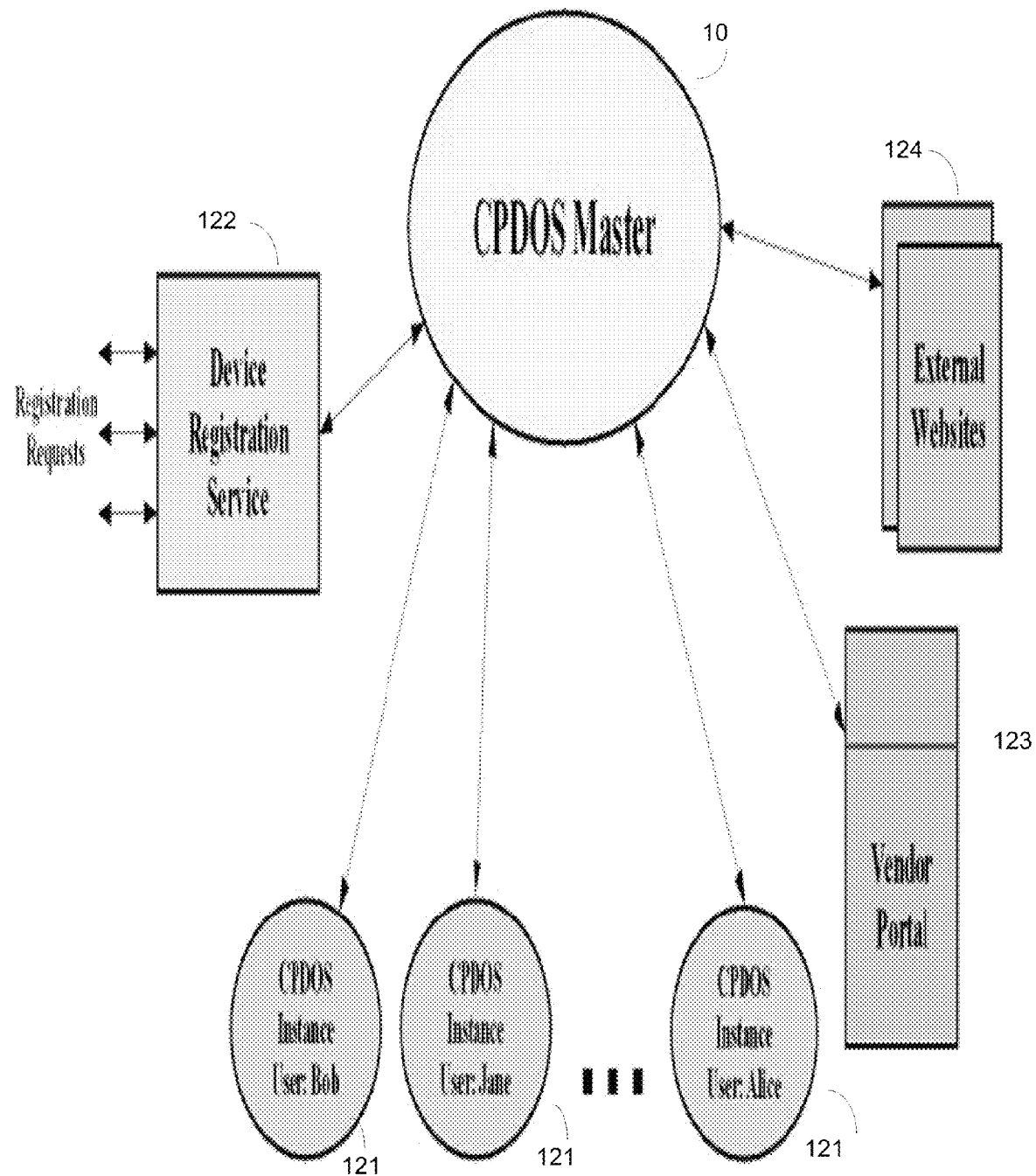
FIG. 2 illustrates the CPDOS master, multiple CPDOS instances, a device registration service, external websites and vendor portals according to an embodiment of the invention.

FIG. 2 illustrates the CPDOS master 10, multiple CPDOS instances 121, a device registration service 122, external websites 124 and vendor portals 123 according to an embodiment of the invention.

Communication Between DA's and DD's

For most device communications, CPDOS uses a document encoding format, such as XML (or an XML-based language, such as RSS and SOAP). The CPDOS instance issues a software request or procedure to the device (e.g. RPC, Java RMI). The DD of the corresponding device is responsible for translating the software request into an XML format. When the relevant DA receives the request, it is responsible for translating the XML into a device-readable request. This mechanism is used to translate all data, messages and procedures between the device and the CPDOS.

Certain devices might not support XML-based communication. In addition, some devices might require other more efficient device-specific data communication formats. For example, devices that display streaming video may require the CPDOS to send the data in an encoded video format. The DD's and DA's of these devices will be responsible for encoding the CPDOS software requests and procedures in the device-specific format.

The CPDOS instance can store several requests or responses to a single device, using a request buffer. Once the device polls the CPDOS instance, it can aggregate these messages and send them together to the device, through the DD.

Web Services

As part of the CPDOS instance environment, certain tasks can utilize, operate and manage web-service accounts associated with the user (e.g. e-mail, social networking profiles, photo sharing, e-commerce sites). Users, who wish to allow CPDOS tasks to access their accounts, provide CPDOS with their account information. Similar to the Device Image and Driver that is associated with different user assets, a Web-Service Driver (WSD) and Web-Service Image (WSI) are associated with each online account. The WSD is responsible for logging in, operating and parsing web accounts. The status and parameters, as well as the login information of each account are stored in the WSI. In contrast to assets, communication with web-services are initiated by CPDOS, and not by the web-service itself. Passwords and online account information can be inputted through the Personal User Portal.

Device Registration Service

When there is a need to register a new device into the system, the user is required to provide the device with the user ID and password, and possibly an initial access URL (we assume that in most cases, the access URL will be predefined by the device vendor). The DA sends a registration request to the URL. The Device Registration Service (DRS) 122 checks whether there is already a CPDOS service assigned for the user. If there is one, the DRS sends the DA a unique access URL and a unique device ID, which the DA will use in subsequent requests to CPDOS. In addition, DRS locates the DD and the DA that match the device ID, and instantiates them in the user's CPDOS instance. The DRS is also responsible for disconnecting devices from CPDOS, and for switching and sharing devices between multiple users and CPDOS instances.

The configuration of a new device can be performed with a required initial access URL and a user ID and password at the user's home. The user may configure the Dynamic Host Configuration Protocol (DHCP) that is part of the home router. The device can "discover" its unique URL and the user ID using an option of DHCP similar or identical to Web Proxy Auto-Discovery Protocol (WPAD). In this way, the required information is configured only once by the user, and can be used by all of her home devices.

During device registration, if the user does not have an existing CPDOS instance, DRS notifies the CPDOS master that it needs to create a new CPDOS instance for the user. If such an instance can be created, the procedure follows as before. If not, the device receives a message about the need to register the user.

Personal User Image and Portal

Each CPDOS instance 121 has a single Personal User Image (PUI), which contains the status, parameters and preferences of a single user. Note that asset and web-service user-defined information is also contained in the DIs and WSIs.

Users can manage and register their assets, tasks and personal information on the CPDOS, using a Personal User Portal (PUP). Users first login into PUP, and then access a view of their assets, tasks and personal information in their CPDOS environment. The PUP allows users to easily select, configure and run new tasks, and to control their general configurations and preferences that are defined in the UI. It allows them access to external information about their assets and available tasks they can run, install or purchase from developers. It also serves as a means of communication with the asset providers and service facilities. The PUP provides support for a rich set of web access standards (e.g. HTML, WAP, CGI).

Figure 3:
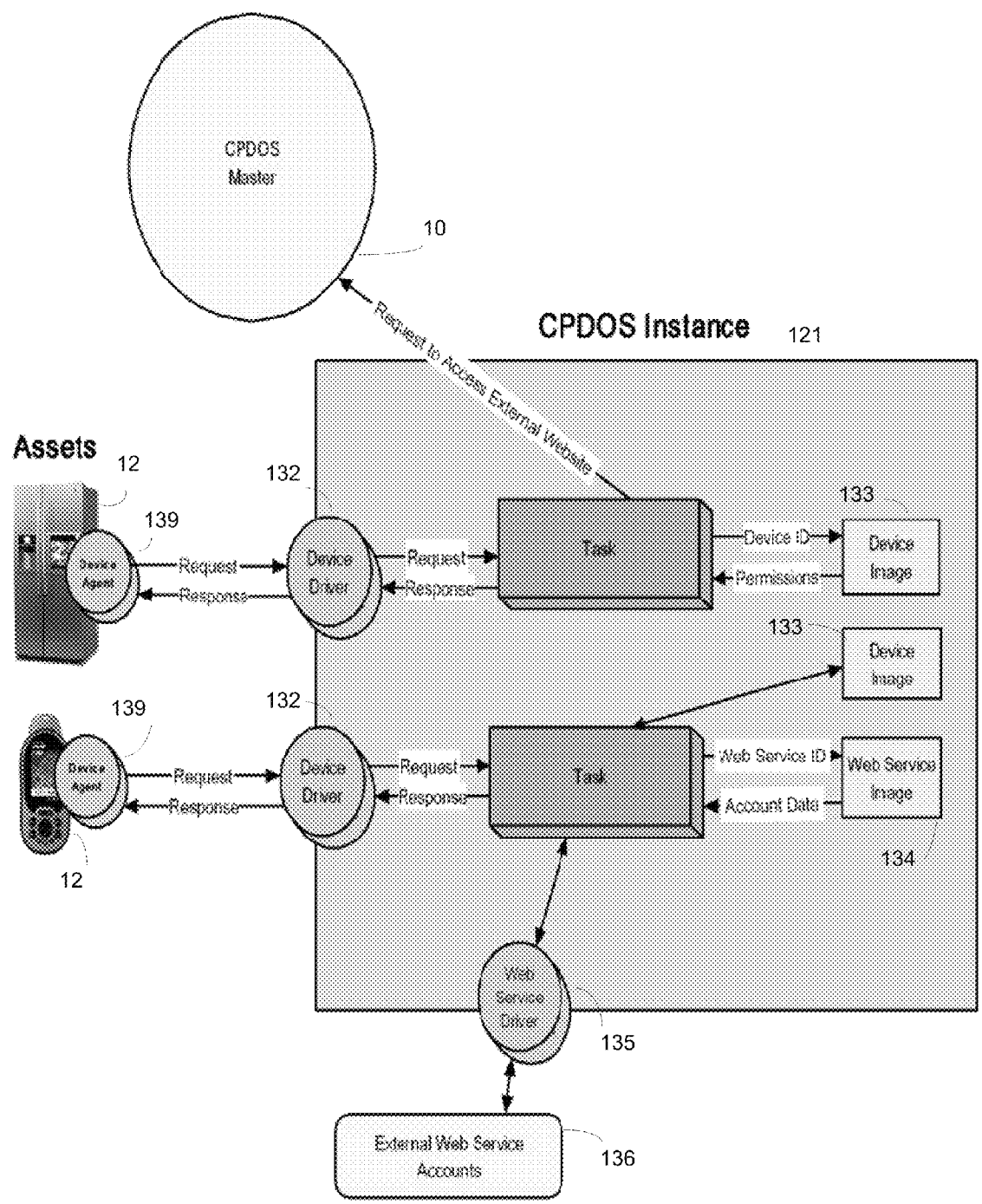
FIG. 3 illustrates a CPDOS master, a CPDOS instance and two user devices, according to an embodiment of the invention.

FIG. 3 illustrates CPDOS master 10, CPDOS instance 121 and two user devices 12 (also referred to as assets) that include agents 139, according to an embodiment of the invention.

FIG. 3 illustrates the CPDOS instance 121 as including tasks 131 that interact with device drivers 132, with device images 133, web service images 134 and web service driver 135 that in turn interacts with an external web service account 136.

Tasks, API and Libraries

CPDOS tasks 131 operate in a confined environment. Each task 131 is associated with certain DDs 132 and DIs 133, and WSDs 132 and WSIs 134, and with unique request and response functions. Request functions define the requests from the asset to CPDOS, and from CPDOS to a web-service through the corresponding drivers. Response functions similarly define the response sent from CPDOS to the asset and the response from the web-service to CPDOS. Each request and response has different input parameters, and can be defined as synchronous or asynchronous (periodic or event triggered). Requests can also be associated with certain responses and vice versa. Certain common requests and response will be defined (e.g. turn on/off, local time on the device, device status checks). In addition, each task has access to a common API and libraries. These include service functions for accessing DI, WSI and PUI information (e.g. asset model information and capabilities), system calls for accessing external services through the CPDOS Master (e.g. accessing the local weather provider, device warranties status) and functions for interacting with PUP. Tasks have shared and private storage, that can be used to save their state and communicate between certain tasks. Security and data coherency issues among multiple tasks will be resolved by the CPDOS instance.

Certain computing and storage intensive processes can be sent by a task through the CPDOS instance and then through a system call to the CPDOS Master to external SaaS providers. For example, a home security device connected to CPDOS, might be conducting real-time video surveillance. At certain intervals, it can send photos to an external face-recognition service. The face-recognition process does not have to run directly on CPDOS, but can be sent to a remote service.

Certain predefined tasks will run on CPDOS that will not be under the control of the user. Two examples of such tasks are Vendor Monitoring Tasks (VMT) and Content Management Tasks (CMT). VMT and CMT are not vendor specific. VMT control the flow of information between CPDOS and the asset vendors. Vendors may wish to receive updates on the status of their devices, to update relevant DDs and DIs and to provide service functions for operating their assets. CMT provide advertisements, offerings, software updates, instructions and content for specific users, according to their asset information and usage patterns. VMT and CMT can also access the PUP in order to display graphical content, instructions and offerings. In addition, CMT can display content on and upload data and software to other assets and web-services. These tasks serve as brokers between third-party applications and the CPDOS environment (assets, images, drivers, user data).

TASK EXAMPLES

Smart Sprinkler Scheduler

Associated assets: sprinkler
Associated web-service: personal online calendar account
External service: online weather provider
Irrigation System Request: command request
CPDOS Response: command response
Data flow:

Sprinkler DA sends its status and a command request to CPDOS. The CPDOS DD receives request and device ID and translates the data for CPDOS. CPDOS verifies the device ID in the DI, and updates the device status in the DI. The CPDOS activates the smart sprinkler scheduler task.

The task checks the current status of the sprinkler in the sprinkler DI.

If it is on, the task checks when the sprinkler needs to be turned on again in the sprinkler calendar status in the WSI of the personal online calendar account. It then sends a command to the sprinkler through the sprinkler DD, to turn itself off, and to issue a new command request according to the next scheduled irrigation time on the online schedule.

If it is off, the task issues a system call to the CPDOS Master, in order to check the user's local weather at an external online weather service. It then checks the calendar when the sprinkler should be turned on in the same fashion as before. If the last day was rainy, the task sends a command to the sprinkler to turn itself on and issue a new command request in half an hour, and if the day was sunny, it sends a command to the sprinkler to turn itself on and issue a new request in a full hour.

Home Appliance Remote Control

Associated assets: various home appliances, smart phone
Associated web-service: personal online calendar account
External service: online TV guide
Description:

A basic and important CPDOS application is the universal virtual Remote Control (RC). The RC will have the ability to observe and control user assets. For example, a smart phone will be able to serve as a remote control for all home appliances. The RC can replace all the existing IR based remote controls, which are hard to operate and have different and primitive interfaces. Instead, the user will be able to operate a uniform, self-explanatory and graphical interface that can provide rich set of control functions, not only low level programming of each asset. For example, the new RC can apply a home movie configuration that simultaneously connects the DVD to the receiver and projector, turns on the projector, enables surround audio on the audio receiver and lowers the movie screen. Such sequences of operations can be operated as a single user-configurable task with a graphical interface, called by a main RC task.

The RC will be able to display an overall status of all controlled assets including their internal content. Content which is moved between devices (e.g. pictures from a camera to the PC, or a video clip from the PC to the WiFi enabled TV) would be transferred via CPDOS or directly over the home network, in the case where devices are connected to the same local network. In the latter case CPDOS would control and monitor the information transfer and the results of the local operation would be updated in the device state maintained by the appropriate DIs. The choice of the method of data transport will be transparent to the user, and the RC has exactly the same functionality and user interfaces for both modes.

The phone will issue remote control commands, which will be executed by the home appliance RC task, utilizing all the necessary personal, asset and web-service images (PUI, DI and WSI), as well as external services such as an online TV guide. Each asset DI contains the user-controlled capabilities of a specific asset.

Figure 4:
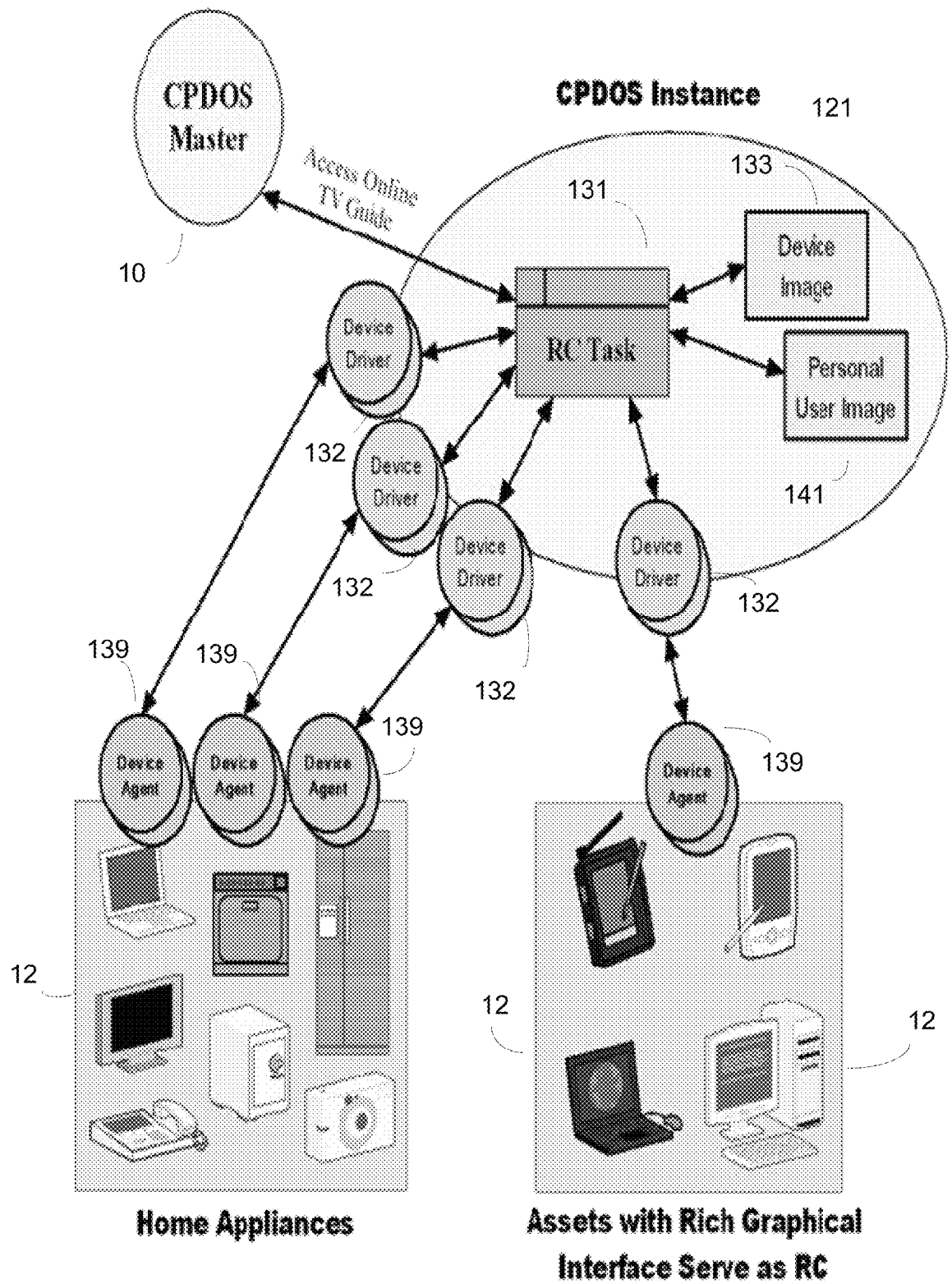
FIG. 4 illustrates a CPDOS instance as including tasks that interact with device drivers, with device images, with web service images and with personal user image, according to an embodiment of the invention.

FIG. 4 illustrates the CPDOS instance 121 as including tasks 131 that interact with device drivers 132, with device images 133, web service images 134 and personal user image 141, according to an embodiment of the invention.

System Monitoring and Billing

The CPDOS Master 10 monitors the proper operation and the processor and storage resources consumed by each CPDOS instance. When an exception occurs, the CPDOS Master can kill tasks, reset the CPDOS instance, restore broken images etc. Since the CPDOS Master monitors all consumed resources, and all external access to and from the CPDOS instances, it also provides billing for internal and external resources, services and offerings.

Vendor Portal

The Vendor Portal (VP) is used by the asset vendors in order to run vendor tasks associated with the assets manufactured by the vendor, across all user environments. VP includes a gateway to the CPDOS Master, through which the vendor can monitor all of its manufactured assets using Vendor Monitoring Tasks, and offer advertisements, instructions and content using Content Monitoring Tasks. In addition, the VP contains an asset database, which stores usage, maintenance, software versions, asset status and user preference data across all of the assets associated with the vendor. These databases can be used by the vendors to create user and asset focused offerings, which are communicated to the user using CMT. The VP can also be used by vendor-independent service providers (e.g. third-party asset repair, content providers, CPDOS software developers).

The CPDOS Master serves as a broker between the VPs and the various tasks run on the CPDOS instances (VMT, CMT). The Master will resolve conflicts, and manage the frequency and resource allocation for VMT and CMT across all VPs.

According to various embodiments of the invention images captured by a camera can be consolidated with other user files. The CPDOS 11 can assist in consolidating user information, messaging, device access, operation and monitoring in a single Web-based virtual personal network.

According to an embodiment of the invention any wired or wireless connected camera such as USB, BlueTooth, Wi-Fi or WiMAX at home and on the road can be utilized for providing image information. Today, personal cameras are either not networked to the Internet. Some cameras have Wi-Fi access for picture downloads to a local PC within the same Wi-Fi network (e.g. Nikon S52c and Canon SD430).

According to an embodiment of the invention direct access of a network-enabled camera to the web-based CPDOS site, which will enable automatic uploads, downloads, publishing and distribution of images, A/V and other content sharing between the camera, the CPDOS, external web-based services and the home PC is provided.

As indicated above, the CPDOS is an Internet server that can be accessed by all networked user devices and appliances, and can exchange information with online Internet services. In this invention we will only focus on a small number of such CPDOS devices and services. CPDOS can also include its own services, such as Web photo albums, email, blogging services and social networking.

The camera (stills and video camera) is a standard digital camera equipped with wireless Internet access such as Wi-Fi, accessing the Internet from a public hot-spot or a private or home access point. WiMAX can be use for a pervasive connectivity of the camera in additional locations.

Home or office PCs are connected to the CPDOS through a software agent as described above. They can be accessed by the CPDOS, and information transfer is enabled by the CPDOS to the CPDOS itself or to other networked devices or services.

The services that are connected to the CPDOS are photo albums, photo processing tools and sites, email services, blogs, social networks and more. These services can be accessed by the CPDOS programs, or are equipped with a special API that allows them to exchange information with the CPDOS.

An example of a certain CPDOS environment is illustrated below.

Figure 5:
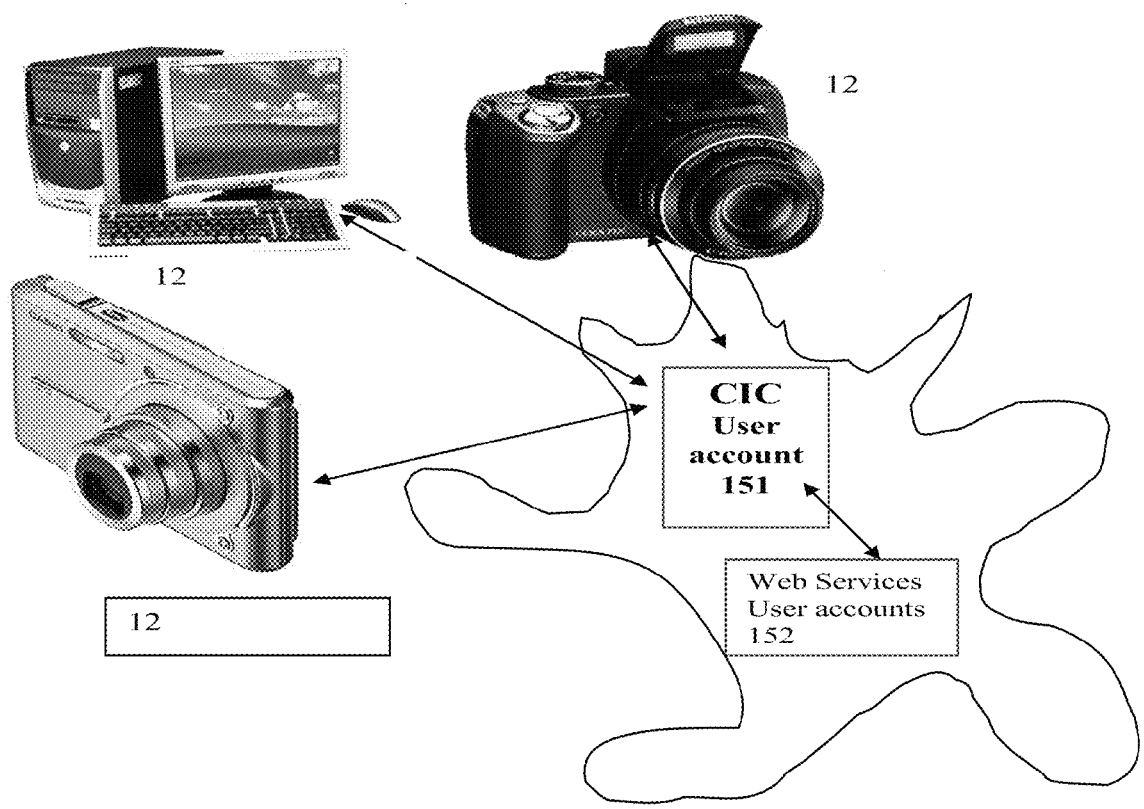
FIG. 5 displays user devices, a CPDOS user account and web services user accounts according to an embodiment of the invention.

FIG. 5 displays user devices 12, a CPDOS user account 151 and web services user accounts 152 according to an embodiment of the invention.

User devices include a studio camera, a home/studio PC and a personal camera.

The user's personal cameras and his/her home/studio/office PC connected via a CPDOS agent (such as agents 139 of FIG. 4) to the CPDOS server 10 on the Internet 11 using HTTP connection to a known URL (e.g. a sub-domain of www..com) and a specific user account.

Other Web services such as social networks (e.g., Facebook, Myspace, LinkedIn etc.), email services (e.g. Gmail, Hotmail, etc.), user blog services and commercial sites accounts 152.

The CPDOS 11 can access the user's private accounts using the data stored at the user database in the user's account in the CPDOS. This access can be based on Web HTTP access or other protocols supported by the various Web services such as POP, IMAP, XML, etc. Similarly, some services can be configured to work with the CPDOS using a published CPDOS API. Public services that do not require a user specific account can also be accessed through the CPDOS account or through open Web access.

The overall software architecture of the camera can be any one of known architectures. For example—the camera's software can be built on top of a real-time embedded operating system such as the Nucleus RTOS by Mentor Graphics, and is run by an embedded processor such as ARM or MIPS. In particular, the camera needs to implement a TCP/IP networking stack and a special network interface driver for Wi-Fi (802.11) or some other physical wireless network.

Various networking protocols can supported by Nucleus and the physical drivers. Our implementation only requires the 802.11 driver and the following protocols: IPv4, 802.1X, SSL, FTP, TCP, HTTP, DNS and DHCP.

The 802.11 connectivity is accomplished via the existing 802.11 support that includes a WSM (Wi-Fi Selection Menu), a WCB (Wi-Fi Connection Browser) and the standard authorization access protocols which are part of the 802.1X standard. In many cases such as free/paid hot-spots, conferences and hotel rooms, the Wi-Fi access is enables only after a special browser page is filled with an access code (see for example the Nomadix product at http://www.nomadix.com), user ID, and an agreement marking. Since we envision that simple cameras will not support full browser functionality (this adds to the fact that we would like to hide the multiple Wi-Fi authentication and authorization protocols from the average user) a simplified TIW (Text Input Window) is used for all access codes. A special application written above the various 802.11 protocols and above a stripped down browser, detects the fields that are require to be filled and will present them to the user in a simple way, without displaying the whole downloaded Web page.

Once the user camera connects to the network, it accesses the CPDOS (via standard HTTP or HTTPS protocols) and performs an authorization using SSL and password verification. At this point it will connect to the CPDOS using a simplified Web, interface so that the camera can use a slim version of an HTML/XML based browser. In addition to the specific application, the simplified Wi-Fi access and the stripped down browser, the camera application includes an advance file transfer protocol that includes compression/decompression, differential tracking and a cache at the CPDOS, so that objects that were already transferred can be reused from the cache. In addition, this would provide the ability to recover from abrupt network disconnection, and would allow the ability to resume the transfer from where it was left off. These functions are required due to the sometimes limited and unreliable nature of Wi-Fi connections at some hot-spots. In order to overcome firewall limitations the camera will access the CPDOS periodically at adaptive polling intervals in order to conduct CPDOS originated functions.

The CPDOS software (such as a user agent) that is related to the camera applications is similar to other plug-and-play devices connected to the CPDOS 10. The CPDOS maintains an image of the camera that includes its basic properties (maker, model, serial number etc.), a description of its content (full metadata and partial data) and other important parameters (current connectivity status, file transfer state, hot-spot connectivity history, log of recent transactions, log of actions taken by the camera etc.). The CPDOS maintains an expandable set of camera server applications to be later described. In addition, it maintains a connection with other relevant devices (e.g. home PC) and other relevant Web services (e.g. Picasa, Facebook, Gmail).

The home, studio or office PC connection to the CPDOS is accomplished by a special CPDOS driver that is installed using the regular Window installation mechanism. Similar to the camera, the PC also periodically accesses the CPDOS, and certain functions can be operated on the computer through the CPDOS. In particular, the PC can exchange files with the CPDOS or a local camera, under the direction of the CPDOS software.

Wi-Fi Connectivity and Authorization

Available Wi-Fi networks are presented for the user on a scrollable selection menu on the camera. From this menu, the user has the ability to select which Wi-Fi network to connect to. Basic information on the network will displayed through the menu, such as name of the network, speed of the network and signal strength.

There are two types of Wi-Fi connections that the camera utilizes:

Networks with no access code—the camera seeks to connect to an available Wi-Fi network. If there is an available free Wi-Fi connection, which requires no password or connection code, the camera connects to it automatically. Alternatively, these connections are displayed and can be selected on the scrollable or touch-screen WSM (Wi-Fi Selection Menu).

WIFI networks requiring an access code—the camera displays these types of connections on the WSM. The user can try to connect to one of these Wi-Fi networks, by providing the relevant access code and user name. These will be inputted by the user using the TIW (Text Input Window), which enables inputting alphabetical and numerical codes. The user also has the option of saving the login information and access code for future use, in order to avoid having to input the same codes numerous times.

After a WIFI network was selected, the hotspot may require an additional step of login activity. In such cases, a server that connects to the hotspot "kidnaps" the first attempted HTTP connection and returns a login Web page. Such Internet connections that require a login through a Web browser have a special built-in assistance at the camera software. In order to activate these types of connections, the user has to activate the camera's WCB (Wi-Fi Connection Browser). The WCB either displays the default connection screen (it might omit non-essential information such as pictures), or parses the Web page and provides the user only with the essential login fields, such as User ID and access code. The user is then able to input the code through the TIW. We discuss additional methods of connecting to connection requiring an access code, which do not require the user to type information through a code input menu, on the Text/OCR/Barcode recognition section.

After achieving a stable WIFI and Internet connection, the camera accesses the user's CPDOS URL (using HTTP over TCP port 80, to overcome any potential firewall blocking), and maintains continuous connectivity with the device image on the CPDOS.

Camera Applications

Downloading and Sending Video, Pictures and Audio Through Email

The user has the ability to easily send video, picture and audio emails to multiple recipients. Once the user selects which files to send as an email, the camera downloads and displays the user's email contact list from the CPDOS. The CPDOS maintains an email contact list, by frequently parsing the user's Web and PC email accounts. The list can be customized and organized by the user at any time, by accessing the CPDOS from any Web browser. After the camera is connected to the CPDOS, it automatically refreshes the list, and downloads it from the CPDOS. This happens regardless of whether the user is currently trying to use the email function, in order to speed up the process of sending emails.

The contact list is displayed on the camera as a scrolling menu, and the user simply selects the email addresses from the predetermined list. The contact list is designed to enable the user to send emails, without using the TIW. The user also has the option of inputting a new email address, by using the TIW. The user can utilize a number of standard email subject and body forms, downloaded to the camera from the CPDOS. The user can also customize these forms through the CPDOS. The user has the option of writing a new email subject and body, by using the TIW.

In certain configurations, the user has the option to use voice recognition software in order to choose the recipients of the message and the body and subject of the message. The user records the relevant information through the camera inherent microphone and audio capabilities. If the camera is not itself equipped with voice recognition software, the audio information is then sent to the CPDOS, where the voice recognition software is utilized in order to analyze the audio information sent by the user. The CPDOS converts the audio information into textual information, and sends it back to the camera for verification by the user.

Once the user has created the message and its recipient list, the metadata of the message is sent to the CPDOS. The metadata includes the size of the message and information about its contents and the progress of the file transfer. The camera then begins to upload the message and the attached files to the CPDOS. If at any time during the file transfer, the connection is interrupted, the CPDOS and the camera are able to automatically resume the connection from where the file transfer left off. The upload process is executed automatically in the background. The user does not have to follow the progress of the upload process and it does not interfere with the operations of the camera. Once the message is fully uploaded to the CPDOS, the CPDOS will send the message to the recipients, and a notification will appear on the camera screen. A user-defined reply address will appear on the message send by the CPDOS, enabling the recipients of the message to recognize and reply to the user's message.

The user also has the ability to download and display received emails. The CPDOS holds the user's email account information. The CPDOS automatically logs into the user's email accounts, and frequently accesses the user's emails, to check if any new messages have been received. If a new message is received, the CPDOS posts a notification to all relevant device images, including the camera. If the camera polls its device image, and is notified of the new message, the camera displays a notification on its screen. If the user wishes to view the message, the camera downloads the message from the CPDOS and displays it to the user. The user then has the ability to respond to the message, by send either a video, picture or voice message through the camera, using the standard method specified above.

Downloading and Publishing Video, Pictures and Audio Through Web Services

The user has the ability to easily publish video, pictures and audio to multiple picture-sharing sites, social networks and other Web services.

In order to upload files, the user selects which files to publish and the appropriate destination for these files, using a predefined scrollable menu, or by entering new entries into a TIW. After the user makes the necessary selections, the camera accesses its device image on the CPDOS, and provides it with the metadata of the files (names, file types, sizes of the files, time of last modification), and with the identity of the destinations (selected from a list, or entered manually). The CPDOS checks whether the files already exist on the CPDOS or on its cache. If they don't, the camera begins uploading the files unto the CPDOS. If they already exist, the CPDOS utilizes the files that are already in the cache. In addition, the CPDOS tries to log into the user's different web service accounts, preferably using the user's personal account information that was provided by the user to the CPDOS in advance. The CPDOS then either parses the site content in order to post onto it, or it communicates with the site in case it supports the CPDOS API. If the user lacks any relevant account information, it sends a notification to the camera, and the user can input it with a TIW. The CPDOS then creates the relevant posting on the Web-service, and begins uploading the files to the various Web-services. If more information is required (such as album names/dates, names of picture, people tagging, new blog entry specifications, etc.) the CPDOS sends the camera requests for additional information. If the user has already specified any of this information on the camera (in form such as automatic face recognition and picture tagging, or GPS location tagging), or if there are any existing default templates, the camera automatically sends them to the CPDOS. If not, the camera asks the user for additional information, which the user enters via the TIW. Once the user provides the necessary information, it is sent from the camera to the CPDOS, and the CPDOS uses it in the relevant Web-services. Once the postings are complete, the CPDOS sends a notification to the camera.

To illustrate downloading functionalities, we will use the example of a picture-sharing site, such as Picasa. It should be stated that the example we use is applicable to any other picture-sharing site, social-networking site, blogging site, video-sharing site or any other user-generated content publishing and sharing site. In order to view/download content from a picture-sharing site, the user specifies a picture-sharing site he/she wishes to access, through a scrollable menu or by entering a new site with a TIW. The site identity is then sent to the CPDOS. If it is required, the CPDOS accesses the site using the user's account information (some sites do not require a log-in in order to view content stored on them—such as Picasa and Myspace), and if there are any problems with the log-in, a notification is sent to the camera. The CPDOS then sends the camera the user's friend/contact list and the user selects using a scrollable menu (or by entering a new name with the TIW), which of his/her friend's accounts he/she wishes to view. The CPDOS attempts to access the friend's site, and once it obtains access, it parses the relevant content on it (pictures in our example), in order to enable the user view them with ease. The parsing is done either according to the CPDOS site-specific parsing software, or using the site's configuration, in the case it made use of the CPDOS API. The CPDOS provides the user with a list of the albums, and once the user selects which of the albums he/she wishes to view, with a scrollable menu, the CPDOS then downloads the picture set. The picture set (includes pictures, headers, tags, locations and any other relevant information) is then sent to the camera, in a format that the camera can read. Once some of information is downloaded by the camera, the user can view the content with a scrollable menu, or a slideshow. The user can send the downloaded pictures, publish them, or modify them on his/her camera, using other camera applications.

In addition, the user has the option to receive automatic updates on whether new content has been created on one of his/her contacts' web-services, and has the ability to download and view the content. The CPDOS checks in regular intervals the user's specified web-services, and checks to see if there is any new content on them. Once the CPDOS detects new content, it sends the camera a notification. If the user is interested in downloading and viewing the new content, the camera simply requests the content from the CPDOS, which then proceeds to download the content from the website, in the method specified above.

Uploading and Downloading Content and Messages Through the PC

In this section we assume that the user has installed a software CPDOS agent on the PC, which has the ability to interact with the CPDOS and preferably with the camera agent as well, if a local peer to peer interaction is enabled. The agent has access to certain directories on the user's PC, which store the user's various content (files, A/V content) and messages (email, IM). The user has the ability to upload and download content either from his/her home, or on the go, through the Internet.

In order to upload content, the user selects with a scrollable menu which pictures to upload to the PC. The camera agent then accesses the camera device image on the CPDOS, and notifies it of the files' metadata (name, size, type, last modified, etc.). In addition, the agent supplies the CPDOS with the camera's Wi-Fi and Internet connection information. The CPDOS then requests the connection information of the PC agent, if it is online. If it detects that both the PC and the camera are on the same local network, the CPDOS orders the agents on the camera and on the PC to establish a direct connection (the CPDOS still supervises the data exchange between the camera and the PC, but reroutes information through the local peer to peer connection. The CPDOS controls the data transfers using file metadata and by sending notifications and directives to the camera and the PC). Once they establish a connection, the CPDOS starts operating the upload of the files from the camera to the PC. In the case that the camera and PC are not on the same network, if the CPDOS detects that some of the files already exist within a CPDOS cache, it uses them for the upload. If not, the CPDOS begins downloading the files from the camera. It then attempts to begin sending the files to the PC. If the PC is offline, the CPDOS stores the file in a cache. Once the PC becomes online again, its agent notifies the CPDOS, and then the CPDOS sends the relevant files from the cache to the PC. Once the file transfer is complete, the PC sends the CPDOS a notification, which is then forwarded to the camera agent. A real-time rapid upload service can be extended to professional photographers, working in a studio. The camera can establish a direct peer to peer connection to the local PC, with control and supervision by the CPDOS. The user selects the rapid-upload mode, and each picture the user takes, automatically is uploaded and displayed on the studio PC screen.

The user has the ability to download and view content and messages from the PC on the camera. The user first specifies the type of content he/she wishes to download (pictures, videos, music, messages and more). The camera then sends the request to the CPDOS, or directly to the PC, if the camera and the PC are in the same network. Assuming the PC agent has already mapped and indexed relevant content and messages on the user's PC, the appropriate file/directory list is sent by the PC agent to the camera agent. The user selects which files he/she wishes to download/view, with a scrollable list. The request is then sent to the PC agent (through the CPDOS), and the PC agent forwards the files to the camera. The photos can then be viewed with a scrollable menu on the camera.

Blogging and Video-Blogging on the Go

The user can create A/V content and easily publish it to multiple blogs, videoblogs, podcasts and videocasts. For video publishing, the user first records the video using the camera. The user has the ability to select a list of videos for publishing. Through the camera's frequent communication with the camera image on the CPDOS, the camera obtains a list of Website addresses which the user has predefined as sites for publishing. In order to publish the user's content, the user provides in advance his/her various account details to the CPDOS. The user selects specific publishing sites from the site list, and specifies the publishing form (what type of content is being published), and the post description, which can be selected from a number of default templates, or with the TIW. Once the user has selected the videos and the publishing site specifications, the camera contacts the device image on the CPDOS. The CPDOS then requests the metadata of the files from the camera. The camera provides the CPDOS with details on the files, including their type, their size, and any user-defined preferences concerning their placement and presentation on the different publishing sites.

After the metadata is received, the CPDOS begins downloading the various content files from the camera. The CPDOS can resume the file transfers if they are interrupted at any time, even if only fragments of a particular file have been received. Once the CPDOS begins receiving the files, it starts uploading them onto the various publishing sites. The CPDOS logs into the sites with the user's account information, and creates a new post/podcast. The posts are created using the basic specifications the user has provided. The user can later adjust and modify the post, according to the user's own preferences.

The CPDOS notifies the camera once the post is published. The user is then given the option by the camera, it he/she wishes to notify any friends of the new posting. If the user chooses to use this option, the user can select an email from a list of standard templates (or write a new one using the TIW). The user then chooses contacts and sends the mail using the standard email feature on the camera (specified in greater detail in Camera Features section 1).

Connecting with Third-Party Photography and Picture Development Web Services

The user has the option to export pictures and video to third-party photography and printing Web services. The camera supports third-party Web-services, such as picture development services (Kodak, Shutterfly, Snapfish), apparel printing services (Zazzle) and picture-mosaic applications (designamosaic). All of these can be accessed directly when viewing through the pictures on the camera, through a scroll menu. If such a service is selected, the camera downloads relevant account information from the CPDOS, if such exists. The CPDOS then checks, by logging in with the user's account and parsing the relevant Web-service Web page, if any additional user information is required, whether the user does not have an account, or if the user's account doesn't provide all the necessary information (such as delivery address information, credit card information etc). If the user needs to supply additional information, the CPDOS sends the camera the different fields needed to be filled by the user. The user fills the information fields through the TIW, and the camera sends the information for verification. The CPDOS then sends the information to the relevant Web site, and once the information has been verified and finalized, the CPDOS sends a receipt or order confirmation to the camera screen.

Webcam and VC (Video Conferencing) Functionalities

The camera can serve as a portable webcam, which provides VC functionalities to the user. This can be done in two methods—either by using the camera as an individual VC device, or by using the camera in order to augment the communications of another messaging device, including a PC or laptop, a home phone or cell phone, which already has a CPDOS software agent installed.

In the first instance, the user can initiate a VC or audio conversation, by selecting one of his/her contacts (or by inputting a new contact with the TIW) from the contact list. The conversation can be initiated with any device that supports it, whether it is another camera, a phone, a PC, a TV or any other device. Once the user selects a contact and a device to call, the request is sent via the CPDOS to the call recipient. If the recipient accepts the call, the CPDOS checks to see whether both devices are on the same network, and if they are, it establishes a direct connection between them, while receiving notifications and controlling the metadata between the two devices. If not, each device creates a streaming connection to the CPDOS, and the CPDOS routes and controls the flow of information to the other device.

In the second method, the camera first accesses an external messaging device (the method for accessing external devices is discussed in Camera Applications section 7). Once the two devices are connected, the conversation is conducted through the external device, while the camera can provide streaming videos, pictures or audio, according to parameters defined by the user. In this fashion, the camera serves as a portable webcam. The information produced by the camera is either sent through the external device, or sent directly from the camera via the CPDOS to the other side of the conversation.

Providing Camera Manufacturer Content and Services

Through the camera software agent, the camera manufacturer can provide a wide-variety of content and services to the user. The content can be fine-tuned to the individual user, according to the user's unique usage patterns of the camera, and according to the overall user statistics accumulated by the CPDOS. All usage tracking is done with the authorization of the user, and in an automatic way. Usage patterns can be sent at regular intervals to the CPDOS device image, where they will be stored. Examples of usage patterns that can be valuable for manufacturers to track include:

Device location: The user's location can be determined using GPS, the connection IP or hotspot address he/she is using, or image location recognition software.

Device usage: The manufacturer can track which functions the user is utilizing, and if the user is not properly using certain types of functions (for example, focus, exposure and zoom). The manufacturer can also evaluate the quality of pictures or A/V recordings taken by the user.

Device condition: The manufacturer can see if the device is malfunctioning or may need some urgent service (battery replacement, lens cleaning etc.).

Status of storage: The manufacturer can track the amount of free space on the camera storage.

The data patterns can be sent to a manufacturer database. The manufacturer may then upload content and services to the CPDOS, which will forward them unto the camera. This way, the manufacturer can provide a very wide gamut of content and services, such as Advertisements and promotions; Interactive operational tips, recommendations, tutorials and user manuals; Camera upgrades and offerings for new models; Repair and maintenance services, close to the user's current or home location; Providing travel and tourist tips and services; Navigational and GPS directions, maps, pictures of the destination; Uploading new software applications and functions to the camera.

The A/V content can include: Photography enhancement applications; Some processor-intensive photography and image processing applications are not possible on the camera itself (of course any of the applications listed below can also be conducted on the camera itself). However, with a connection the CPDOS, the camera can outsource heavy image processing and computer vision tasks to the CPDOS or to the camera manufacturer. In addition, the CPDOS can provide additional information to videos and pictures the user takes, by utilizing its extensive user database and contact information. Examples of such features include: Face recognition and picture/video tagging using the CPDOS personal user database. The personal information may be sent back to the user or used to tag the person; Automatic red-eye filtering; Image/video sharpening; Artistic restyling of images and videos; Handwriting and voice recognition for picture headers, tagging; Text recognition in the CPDOS for photo copies of books, documents, notes etc.; Automatic conversions to other file formats, including .pdf, .ppt, .doc etc.; Tagging famous landmarks and events using a public database.

After files are processed, they can then be published or sent to any user-defined location. The files transfers and information requests to and from the CPDOS are conducted in the same method as specified in sections 1, 2 and 3.

Interactive Picture and Virtual Postcard Shopping

The CPDOS can provide third party vendors and the camera itself with an interactive picture shopping application. Using this application, the user can be offered to buy images/videos according to his/her current location or interest. In addition, the user could purchase images/videos of events the user is attending, and of pictures/videos of the user taken by professional photographers. The content can be offered directly to the user's camera through the CPDOS, according to the usage tracking (see Camera Features section 10), or the user can access a database of the A/V content provider, from which he/she could download the required content. The transferring and procurement of content is done in the same way described in Camera Features section 5.

Examples of picture providers include: Concerts and performances—personal clips, pictures, music; Theme parks—rollercoaster pictures and videos; Museums—pictures and information on items on display, museum catalogs; Tourist sites—site pictures, posters; and virtual postcards—images/videos can be sent to friends and family.

Easy Wi-Fi Access by Text Recognition

For this feature it is assumed that the camera contains some form of text/barcode/OCR recognition application. There may be provided easier access to Wi-Fi hotspots, where the user is required to provide a Web access code. Various complicated processes can be simplified such as the hassle and inefficiency of the camera's browser parsing the Web access code page, and of the user using the TIW in order to input the code. Instead, if the hotspot supports such a function, the user takes a picture of the barcode, or textual information provided by the hotspot owner (on a paper or using a sign). The camera then uses a text or picture recognition tool in order to decipher the access code. It then automatically logs into the Wi-Fi hotspot, with the deciphered access code.

Virtual Distributed File System—(VDFS)

The following systems, devices, methods and computer program products may embrace device heterogeneity and can be beneficial in various manners. For example, an employee can receive a consolidated view of all personal and shared data across the IT infrastructure, workstations, multi-vendor mobile devices, web accounts and mobile storage, and can prompt access to all data. The IT staff can keep track of all data, define and implement fine-grained policies to enforce central backup and security.

There is provided a device, system, method and a computer program product that may facilitate (i) search and access all relevant data from mobile device using virtual desktop; (ii) automatic pre-fetch and synchronization for future availability using learning mechanism; (iii) include email attachments, web data and application data; (iv) can optimize communication cost (e.g. leverage LAN, WiFi, Bluetooth when available) using direct exchange among devices; (v) can provide data integrity—as it follow user and IT rules for uploads, synchronization and backup for all platforms (e.g. removable storage, web services), controls data redundancy levels and storage locations and track data and report loss; (vi) provides data security—as an IT can manage security levels across employee data, allow remote view only, encrypted, read and write access privileges, prevent intermixing with personal data, provide new mobile data scan, erase data at risk (including data lifetime); (vii) provide central reporting of data and mobile device security violations, (viii) allow cost optimization by reducing communications, using chunk based transfer, compression; (ix) offer caching and redundancy elimination, for example, utilize network tariffs and different network technologies for pre-fetching and caching, optimize storage costs, perform de-duplication and compression across all devices, and utilize web-based storage and email services.

There is provided a master that may maintain an up-to-date view of all file metadata for each user, enterprise file directories, email messages and attachments, data in mobile devices and mobile storage, and information in web accounts. Users can access data view through a mobile application or a web browser.

According to an embodiment of the invention a virtual distributed file system (VDFS) s provided. The VDFS provides a ubiquitous and universal access from many devices, including mobile devices, to a plurality of personal and shared files scattered across different devices, file systems, cloud storage services and web accounts. In addition VDFS includes central services that address the access, availability, integrity and security of the data as well as providing application interface (API) to device and cloud-based applications.

In particular, the system includes a virtual distributed file directory system, that includes standard and universal representation and operation conventions combining different data storage and access systems used by a single user in different devices and web services. Among others, devices include cellular smartphones, PDAs, video and audio players, laptops, tablets, netbooks, and desktop computers and mobile flash memory devices that store many types of data and files. Among others, Web services include storage services (e.g. Dropbox, Google Docs, Flickr), email accounts (e.g. Gmail, Hotmail), social networks (e.g. Facebook, Linkedin), financial accounts (e.g. E-trade, Ameritrade) that include many files such as pictures, attachments and PDFs and marketing material. VDFS virtualizes, represents and acts on these files using an expendable universal metadata representation.

Figure 6:
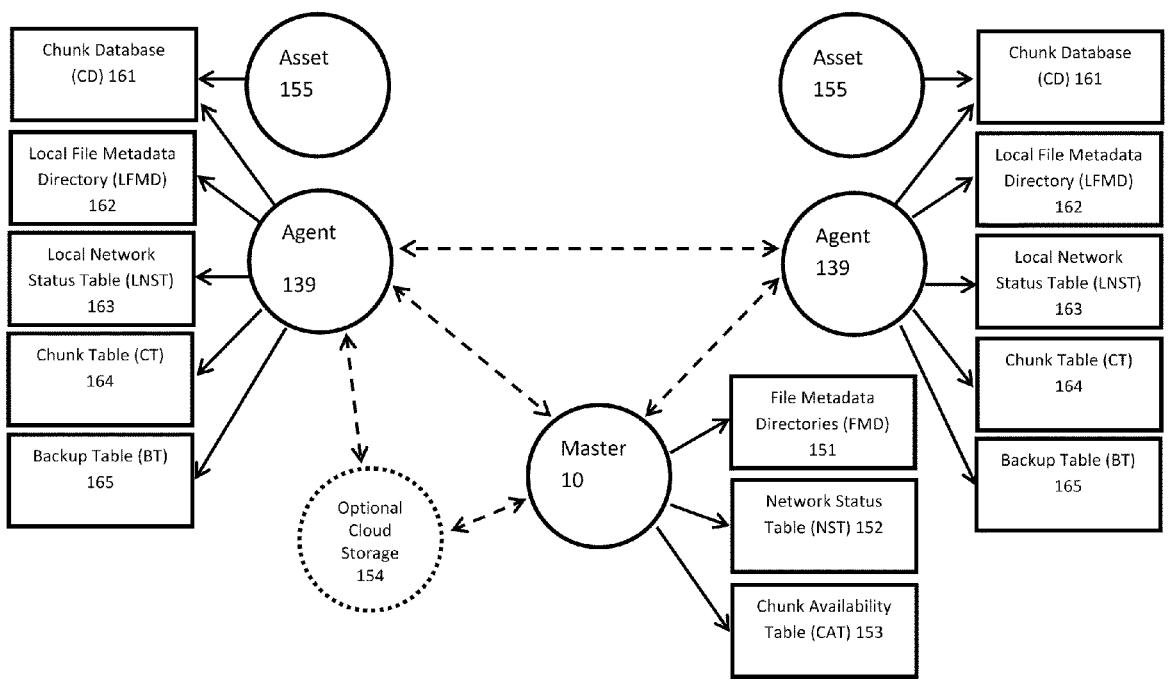
FIG. 6 illustrates a master device, user agents, assets and multiple data structures according to an embodiment of the invention.
Figure 7:
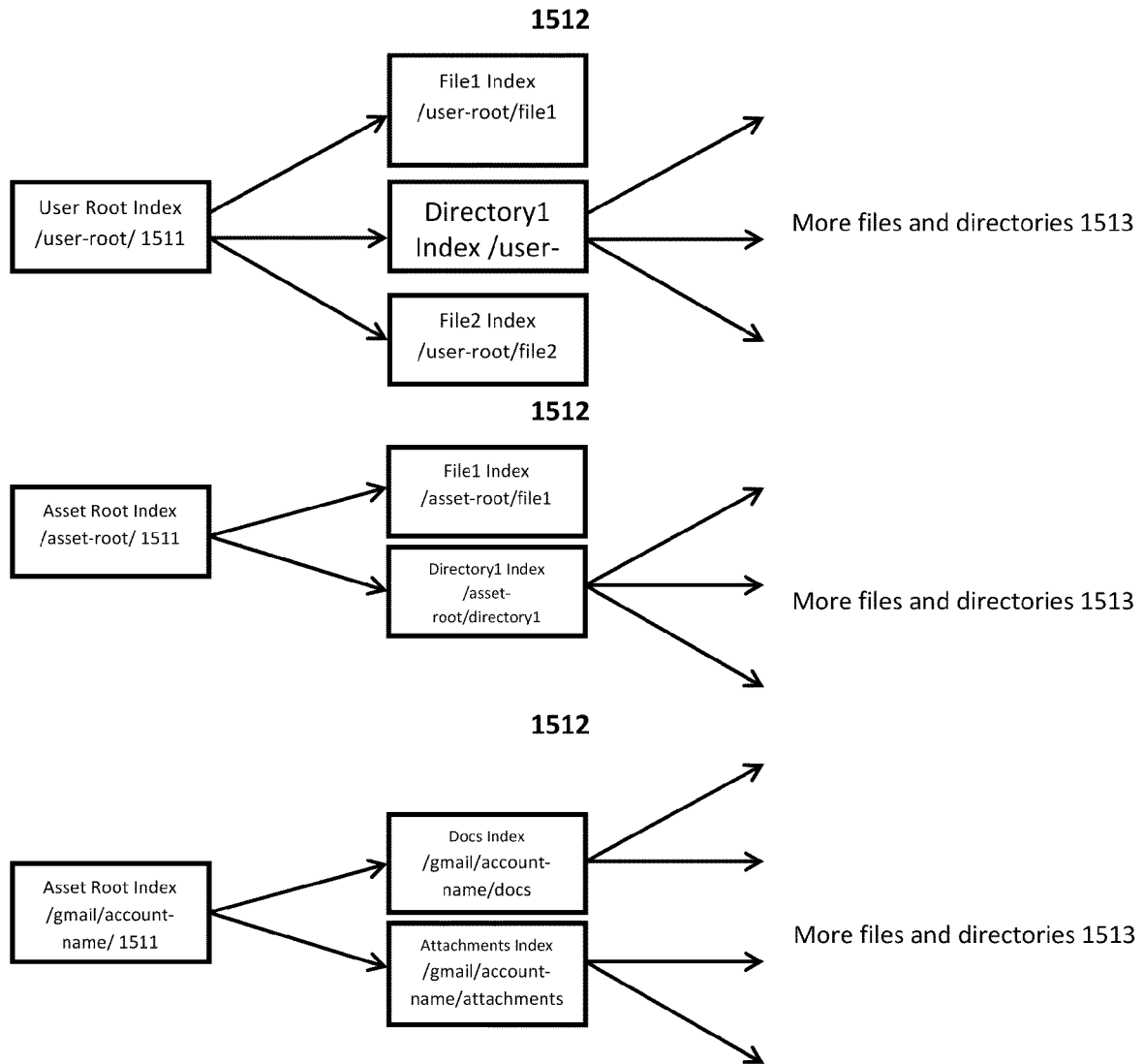
FIG. 7 illustrates a file metadata directory, according to an embodiment of the invention.
Figure 12:
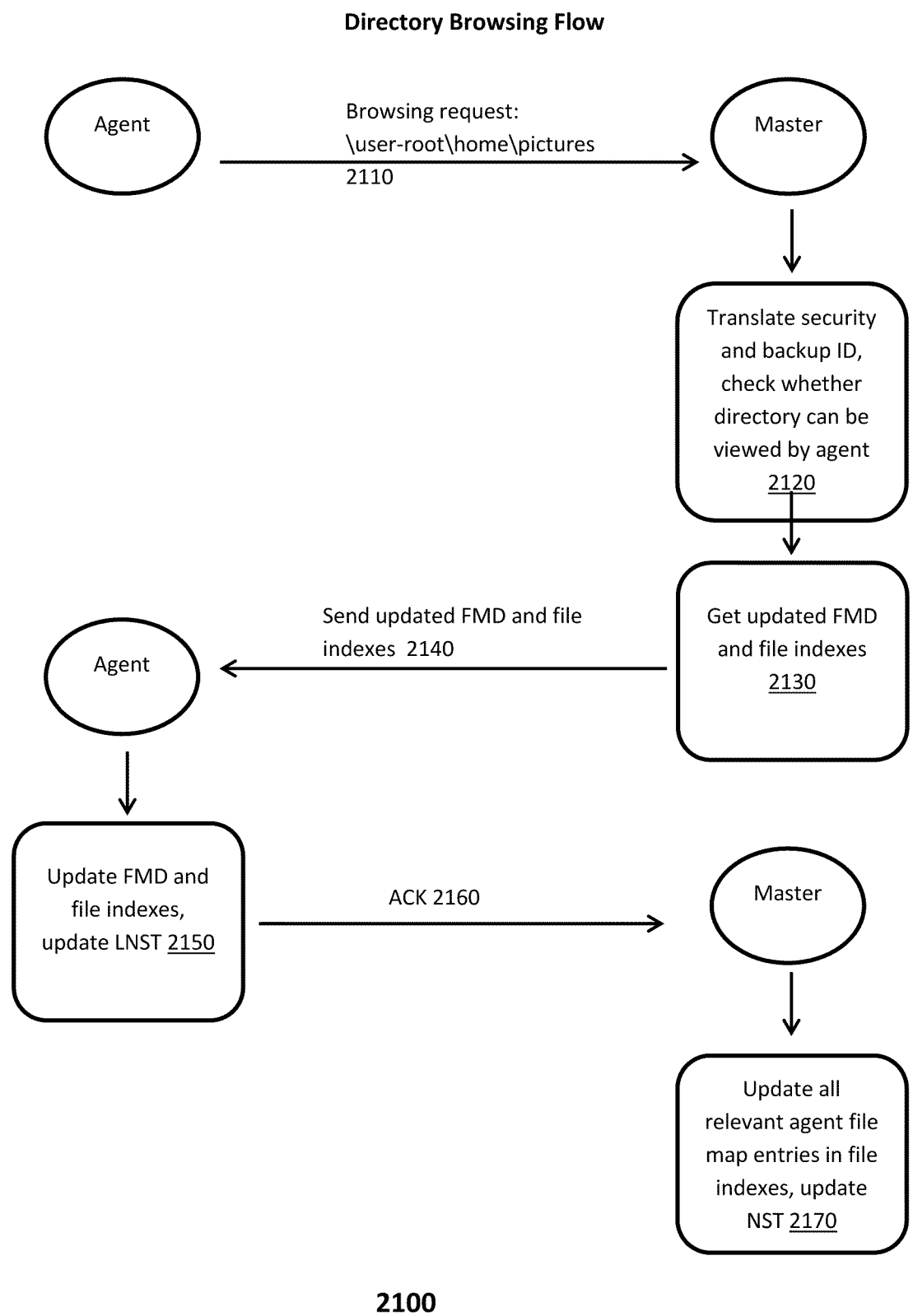
FIG. 12 illustrates a method for directory browsing according to an embodiment of the invention.
Figure 13:
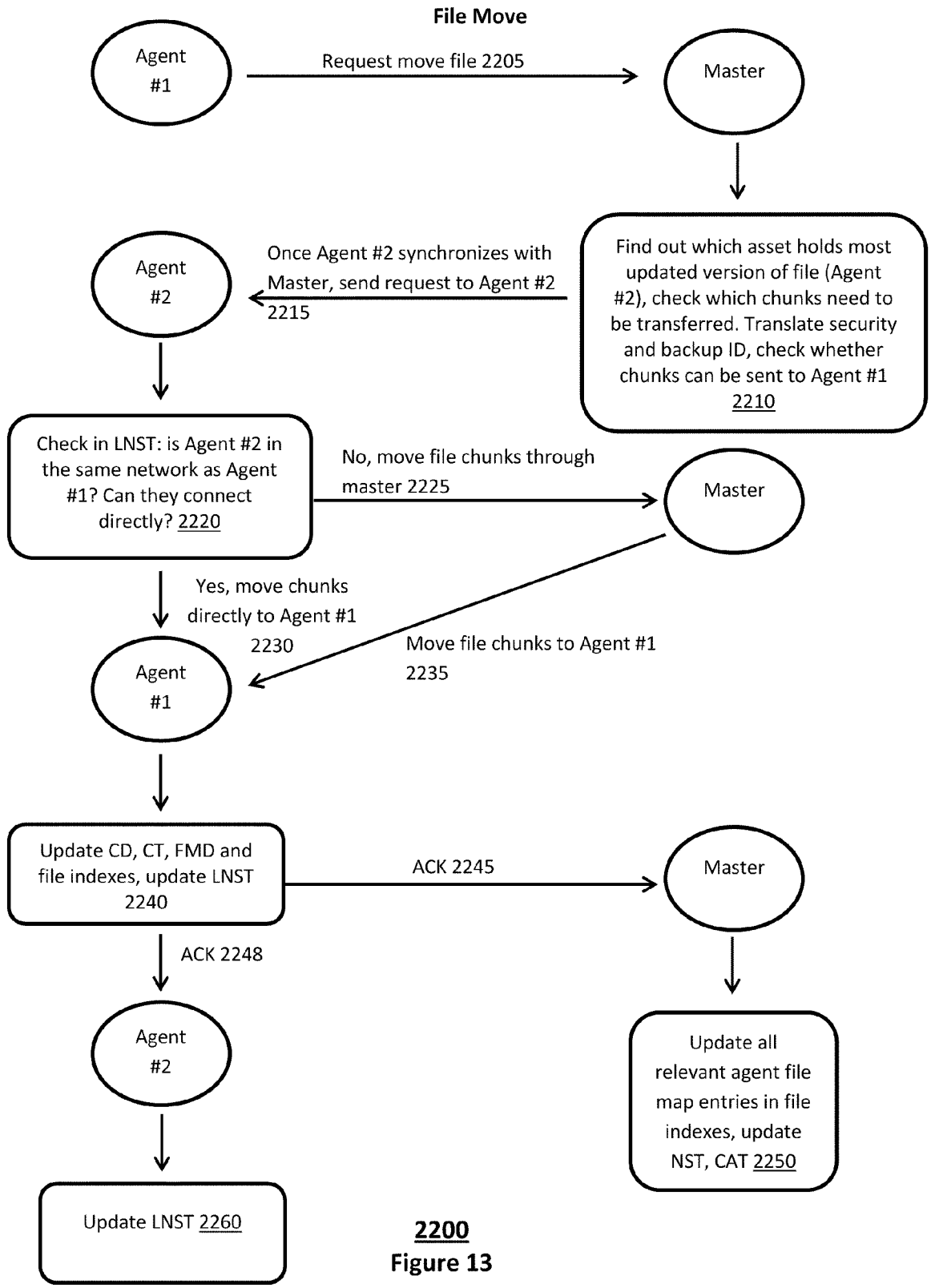
FIG. 13 illustrates a method for file transfer according to an embodiment of the invention.
Figure 14:
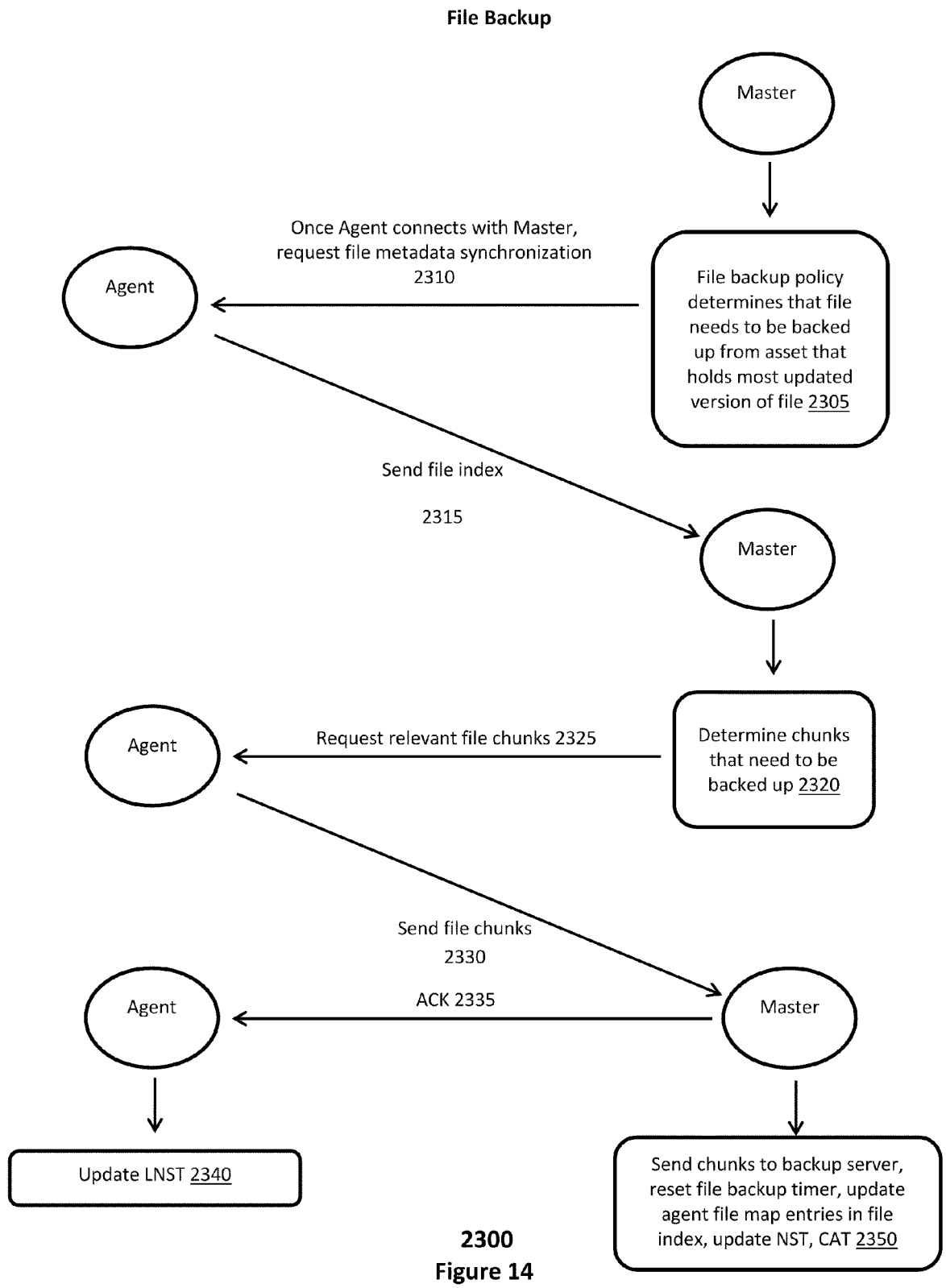
FIG. 14 illustrates a method for file backup according to an embodiment of the invention.

FIG. 6 illustrates a master device 10, user agents 139, assets 155 and multiple data structures according to an embodiment of the invention. FIG. 7 illustrates a file metadata directory 151, according to an embodiment of the invention. FIG. 8 illustrates an individual file index 171, according to an embodiment of the invention. FIG. 9 illustrates a network status table (NST) 181, according to an embodiment of the invention. FIG. 10 illustrates a chunk table (CT) 191, according to an embodiment of the invention. FIG. 11 illustrates a chunk availability table (CAT) 153 according to an embodiment of the invention. FIG. 12 illustrates method 2100 for directory browsing according to an embodiment of the invention. FIG. 13 illustrates method 2200 for file transfer according to an embodiment of the invention. FIG. 14 illustrates a method 2300 for file backup according to an embodiment of the invention.

The multiple data structures include metadata data structures 151, 152 and 153 that are managed by the master device 10 and so called local metadata data structures 161-165 that can be managed by user devices or assets 155. It is noted that the data structures manages by the system illustrated in FIG. 5 can also include information data structures that stores the information (files) described by the metadata data structures.

An asset 155 can be a user device or another user entity including virtual user entities such as a web account, an email account, a social network account and the like. Although FIG. 5 illustrates asset 155 as being separated from an agent—this is not necessarily so and both can be integrated. Additionally or alternatively, an asset can interact with the master 10 via an agent.

The master device 10 manages metadata data structures such as file metadata directories (FMD) 151, network status table (NST) 152 and chunk availability table (CAT) 153, wherein a chunk is a file portion.

Master device 10 exchanges information over a network with a plurality of agents 139. The master 10 and agents 139 can be implemented in C, C++ or Java and hosted by a computer or a server. The master 139 can be is a centralized server that stores, manages and updates all the metadata of the files and directories in the system—including metadata data structures 151-153. It can be accessed by the agents 139 through any standard communication, in particular through HTTP and HTTPS or SSL. The master 10 may be de-coupled from the files themselves, which are distributed among the devices, file systems and web accounts, however, it can cache such files for access in a disconnection events. A database (such as database 14) can store at least a portion of the files.

Moreover, a central depository of the files (can be included in database 14) can be deployed either on an adjacent central storage server, or as a separate cloud based service.

The assets depicted in FIG. 5, can be tangible user entities such as user devices such as mobile and fixed devices (e.g. file server, PC, laptop, tablet, laptop, mobile phone) or virtual user entities such as web accounts (e.g. email services, online picture repositories, online document services) that store data, which are associated with a user or group of users.

Agents 139 are software agents that can access and manipulate asset data. The agents can communicate with the master using a plurality of protocols and can also communicate directly with each other or with the central storage. If the asset is a physical device, the agent is installed as a device application or a software daemon (e.g. Unix daemons, MS Windows services), and has access to the device file system. If the asset is a web service or a user web account, the agent is a server program, allocated at the master, which can periodically login to a user account, using a stored user ID and password, and read, parse and if needed modify the files contained in the web service or user web account.

The master 10 may use two metadata data structures to manage files in the system. The File Metadata Directories (FMD) 151 contains the most up-to-date status of all file metadata on every asset in the system. A non-limiting example of FMD is illustrated in FIG. 7 and includes at least three directory levels 1511, 1512 and 1513.

The Network Status Table (NST) 152 contains the network state of each asset in the system, as depicted in FIG. 8.

Agents 139 and assets 155 may use a local version of the master's metadata data structures, called Local File Metadata Directories (LFMD) 162, and Local Network Status Table (LNST) 163. The LFMD and LNST contain a subset of the entries that are contained in the master's FMD and NST.

In addition, each agent (or asset or both) can access a Chunk Database (DC) 161. DCs 161 contain the chunks of the files rooted on the asset itself, and additional user files that were pre-fetched to the asset or created at the asset. For example, all of the user's recent documents (e.g. last 7 days) may be pre-fetched to all of the user's mobile device FCs. Files in the system can be partitioned to content dependent chunks as described in U. Manber, "Finding similar files in a large file system," in WTEC'94: Proceedings of the USENIX Winter 1994 Technical Conference on USENIX Winter 1994 Technical Conference. Berkeley, Calif., USA: USENIX Association, 1994, pp. 2-2, [MCD01], or segmented into sequential blocks. Each chunk or block has a 64-bit SHA-1 signature. Agents use a metadata data structure such as Chunk Table (CT) 164, depicted by FIG. 9, to map their asset's files into chunks stored in the Chunk Database (CD). Each entry includes the location of the chunk in the asset CD, and its signature. Optionally, the entry may also include the location of the chunk in other places such as the cloud storage or an asset.

The master 10 may also maintain a Chunk Availability Table (CAT) 53 that tracks where each chunk is located in the system. Consequently, the master 10 knows which chunks should be sent in case a file needs to be moved to a specific asset. In order to save bandwidth, instead of transferring entire files, the master 10 and agents 139 can transfer individual missing chunks and avoid the transmission of chunks already known at the receiver (A. Muthitacharoen, B. Chen, and D. Mazi'eres, "A low-bandwidth network file system," in SOSP '01: Proceedings of the eighteenth ACM symposium on Operating systems principles. New York, N.Y., USA: ACM, 2001, pp. 174-187. and N. T. Spring and D. Wetherall, "A protocol-independent technique for eliminating redundant network traffic," SIGCOMM Comput. Commun. Rev., vol. 30, no. 4, pp. 87-95, 2000.). Similarly, when a chunk is included within one or more files, it may be only stored once in an asset or in the cloud storage. In the latter case, chunks in the CD can also be shared across multiple users.

File Metadata Directories

The master 10 and agents 139 keep track of the status of files in File Metadata Directories (FMD) 151. Each asset 155 has one or more FMDs 151 that describe the file directories stored on the asset 155. In such a case the asset 155 is considered to be the "root asset" of these directories and its corresponding agent is the primary owner of that directory. For example, a web service like Gmail can have different FMDs 151 for its emails, attachments, documents and pictures. They will all be owned by the corresponding Gmail agent located at the master. Physical devices also have an FMD 151 that describes their internal file system. In addition, all of the agents 139 in the system may share a universal FMD, called user-root whose owner is the master. The universal FMD is a universal file directory that any asset can access or manipulate. Assets may store the entire user-root directory, or certain sub-directories of user-root. User-root may contain frequently used user files and work directories, which the user would like to access and modify from multiple devices.

The FMD 151 is an index-based directory. It contains two types of indexes: a directory index and a file index. Directory indexes store a list of all the files and subdirectories contained in the directory, it also includes group sharing and security policy associated with files originating at that directory. Other information can be similar to other file systems such as Windows-CIFS, Unix-NFS and distributed file systems such as AFS. File indexes contain the file's metadata, as illustrated in FIG. 3. File metadata includes: the file name and path, the file type, the list of chunks in the file, the file's security policy (the security level is the maximum between the file security level and the sub-directory security level), which agents store the file (exclusive to the master version) and additional asset-specific optional metadata. In the agent file map in FIG. 3, each copy of the file on each asset has a valid bit. If the valid bit is '0' the asset does not contain the full most recent version of the file, and if the valid bit is '1' it contains the most recent version. Optional metadata includes metadata that is specific to a certain file system (e.g. thumbs.db data in Windows, user and group level read-write-execute permissions in Unix) or a certain web-service (e.g. MIME data for email services, picture tags social networking sites). In certain examples of FMD, file directories are derived from information that is commonly not described by directory based data. For example, a directory that describes the file attachments of an email service like Gmail, will be rooted at a Gmail account (/Gmail/alice.doe/), rooted at the Gmail agent. Subdirectories can be arranged according to the sender email (e.g. /bob.doe@hotmail.com/) and include all attachments sent from a specific email address. File metadata subfields may include the MIME extension parameters, email subject line, emails address distribution list, and the actual text of the email message. Similarly, VDFS directories can be created for photo storage sites (eg. Flickr, Picasa, Facebook) or other user specific accounts (e.g. broker account statements).

Remote agents may periodically update the FMD tables against the master version. In addition, whenever a change occurs at the agent that requires a communication with the master, such an update is conducted for all the shared metadata.

Network Tables

The master and agents keep a table that contains the network connections of agents in the system, shown in FIG. 9.

The network status table 152 contains the status of the network connection, including the type of the network (e.g. WIFI, Ethernet, GSM) and its name, the IP address of the asset (if the asset has a public IP address) and NAT ports for TCP or UDP protocols, the average bandwidths and latency of the network and the state of the network (e.g. idle, active, disconnected). In addition the table contains any messages that might be waiting to be sent to the given agent. Since some agents might be operating behind a proxy or firewall, the agents rather than the master usually initiate operations over the network. Therefore, if the master or agents need to pass a message to another agent that does not have a public IP address, the messages are stored in the network table until the connection with the agent is established (usually by a periodic poll of the agent to the master using proxy "friendly" HTTP/HTTPS).

Agents 139 keep a local view of their network in their LNST 163. The LNST has the same structure as the master's NST. The LNST includes entries of other agents in the system, and of the master. Whenever an agent issues a request to transfer a file from a second agent, and if at least one of the agents has a public address visible to the other agent, both agents can use their local network tables to transfer the file directly. In other cases a direct connection can be established with the assistance of the master using known methods from peer-to-peer and Skype direct connections. Such techniques are described in Internet RFCs RFC 3489, STUN—Simple Traversal of User Datagram Protocol (UDP) Through Network Address Translators (NATs), J. Rosenberg, J. Weinberger, C. Huitema, R. Mahy, The Internet Society (March 2003) (STUN) and RFC 5389, Session Traversal Utilities for NAT (STUN), J. Rosenberg, R. Mahy, P. Matthews, D. Wing, The Internet Society (October 2008).

Remote agents periodically update the network connection table by sampling the network between the master and the agent. If the master detects that two assets share the same network or can connect directly, it updates both corresponding agents with the NST entries of the other agent.

File Manager

A user is provided with a file manager (file browser) that provides a user interface for the VDFS on an asset 155. The common operations performed on files or directories are: browse, create, delete, move, copy, open (including play, edit, execute), search/find, and modify attributes, properties and permissions (including renaming). Other operations can also be included but not described below. It may also contain additional features inspired by web browsers, including forward and back navigational buttons. Examples for such a file manager are MS Window Explorer and Apple Finder.

Browsing and accessing VDFS files can be done by either a customized file browsing application written for this purpose or the native file browsing application operating at the device such as MS Window Explorer and Apple Finder, or file consuming application like MS Office file applications (e.g. MS Office Word and Excel or third party platforms such as Dataviz Documents To Go for smartphones or Open Office).

VDFS can also be accessed via a browser or a client application running on the asset that approaches the master directly using protocols such as FTP, NFS, SMB, HTTPS or WebDAV. This is achieved by allowing the user to connect to a remote file server included in the master (e.g. net2ftp). The latter case does not involve a coordination of the data between the asset and the master. Therefore we will describe the case where the user is working with the VDFS on a local asset interface.

Directory Browsing

Directory browsing requests are requests to view the metadata of a file or directory without viewing the files themselves, as depicted in FIG. 21. A remote agent (2110) issues directory browsing requests to the master before returning the results to the user. Directory browsing requests include a specific directory or file index and information regarding the time-stamp of the available version.

The master first checks (2120) the security policy of the requested directory or file index. If the security policy allows the agent to view the metadata of the directory or file, the master retrieves (2130) and sends (2140) the most recently updated file indexes of the requested directory or file and their corresponding MFD sections to the requesting agent.

In certain cases when the directory is rooted at another asset, the master first synchronizes its metadata before sending the results, with the appropriate root agent. If the information was not changed since the last remote agent polling (each version carries an ever increasing sequence number or a time signature) the master just confirms the existing data. If an update is required the master makes a complete incremental update of the metadata using the version numbers reported by the remote agent.

The agent then updates (2150) its relevant LMFD entries and directory and file indexes, and sends a corresponding acknowledgement to the master. The remote agent allows a given time period of continuous browsing (several seconds) to the user before checking for more updates from the master. This operation is conducted over all directories including the ones rooted at the asset itself (as another permitted asset may change this directory too). If the agent is disconnected from the master, the browsing result is based on the local version of the metadata. The master then (2170) initiates an update of all relevant agent file map entries in the metadata data structures such as FDM 151, and NST 153.

File and Folder Creation

This operation may be initiated by any file manager application on any asset 155 or over the web. In the most general case, this can correspond with a file or folder that is located at another root asset directory (e.g. the iPhone file manager instructs the creation of a file or a folder at the laptop PC directory. This operation can also be conducted locally (when both the origin and the target of the operation are the local directory). In the latter case, the creation is executed locally, the local metadata (either one of metadata data structures 161-164) is updated and a metadata update message is sent to the master. In the case of a file, the file is parsed to chunks (file portions) that are stored if new at the CD and the signatures and locations are included in the CT. In all other cases, the file is created in a temporary local folder (e.g. /local-asset/temp/) and a corresponding file move command, which is described later, (preceded by a metadata synchronization) is sent to the master. The master handles the file creation as if it was initiated by the master itself. The asset that initiated the command will hold the connection with the master to receive acknowledgements for the pending request.

A very similar approach is taken when file or folder properties are changed.

File and Folder Deletion

This operation may be initiated by any file manager application on any asset or over the web. In the most general case, this can correspond with a file or folder that is located at a different root asset directory (e.g. the iPhone file manager instructs the deletion of a file or a folder at the laptop PC directory). The operation can also be conducted locally (when both the origin and the target of the operation are the local directory). In the latter case, the deletion is executed locally, the local metadata is updated and a metadata update message is sent to the master. In all other cases, a corresponding file delete command (preceded by a metadata synchronization) is sent to the master. The master handles the message as if the deletion was initiated by the master itself. The asset that initiated the command will hold the connection with the master to receive acknowledgements for the pending request. The master will delete this file from its own metadata (still keeping it alive under status delete until all asset metadata is updated) and then send the delete command to the corresponding root's asset.

File and Folder Move and Copy

These operations may be initiated (2205) by any file manager application on any asset or over the web, as shown in FIG. 22. In the most general case, the commands are issued to move or copy a file that is located at a different root asset directory to a second different root asset directory (e.g. the iPhone file manager instructs the move of a file from a laptop PC directory to the Google Docs directory). This operation can also be conducted locally (when both the origin and the target of the operation are within a local directory). In the latter case, it is executed locally, the local metadata is updated and a metadata update message is sent to the master. In all other cases the command (preceded by a metadata synchronization) is sent to the master, which handles the command as if it issued the command itself. The asset that initiated the command will hold the connection with the master to receive acknowledgements for the pending request.

The master first checks (2210) whether the file move/copy is permitted, by checking the security ID of the file with the security rank of the target directory. If the file transfer is permitted, the master derives the collection and order of the chunks that compose this file and place them in the sending queue to the target asset. At this point it sends back the source of the command a "command pending" indicator with the command ID associated with the original request.

The master updates the target agent about the file metadata, including the sequence of the chunks that need to be brought. It also instructs the target about the location of these chunks. In particular it notifies the target if there is an online asset that stores these chunks and the target can directly connect to it. It also notifies the agent whether the file (in its entirety or as a collection of individual chunks) should be transferred directly between the two agents, or whether it should be transferred through the master. The master makes its decision according to the status of the network connection between the two agents, as well as the status of the network between the agents and the master. The agent then acknowledges the master's message, and initiates a file transfer with the agent or with the master itself. The file transfer only involves chunks that are not already stored in the asset's Chunk Database (CD). Each file transfer has a timeout. If the transfer is delayed longer than the timeout due to a network problem, the agent can reinitiate the file transfer with the master. After the transfer is completed successfully, the agent sends the master a "transfer complete" acknowledgement, and then updates its LFMD, file indexes and chunk table. If the file was moved from another asset a file delete command is issued at the master for this operation (as described above). Once the master receives the acknowledgement, it updates the agent's time stamp in the relevant file indexes. Both master and agent also update their NST and LNST after each file transfer, respectively.

FIG. 2 illustrates an example where the most updated version of a file requested by a first agent (agent #1) is stored at another agent (agent #2). Thus, the following stages are executed:

The first agent requests (2205) to move a file.

The master finds out (2210) which asset holds the most updated version of the file (for example—the second agent—or more specifically the user device that has the second agent), checks which file portions should be transferred, translates security and backup identifiers and determines which chunks should be transferred from the second agent to the first agent.

The master sends (2215) a request to the second agent (after the second agent synchronizes with the master) to send various file portions to the first agent.

The second agent checks (2220) in its KNST whether the first agent belongs to the same network—or otherwise can these agent transfer file portions without the assistance of the master.

If the answer is negative then stage 2220 is followed by stage 225 of moving the file portions by the master.

If the answer is positive then stage 2220 is followed by stage 2230 of moving the chunks without assistance of the master.

Once the transfer is completed (or even during the transfer of the file portions) the first agent updates (2240) various data and metadata data structures (such as CD, CT, FMD, LMNST and file indexes).

Once the transfer is completed (or after one or more file portions are transferred) the first agent informs (sends an acknowledgement message) to the master (2245) and to the second agent (2248).

The second agent updates its LNST (2260) and the master updates relevant metadata data structures relating to the first agent such as updating file indexes, NST and CAT (2250).

System Features

File and Metadata Synchronization

When a file or folder is modified on one of the assets, the corresponding agent first updates the file's metadata in the file index, FMD and chunk table, and then sends the new file index to the master in a message. The agent also adds the file's entry to the Backup Table (BT). The master then sends back an acknowledgement message, and updates the status of the file in its file index and FMD. In order to save bandwidth, the agent can aggregate several file modification updates in one message to the master. It can also wait a certain period of time before notifying the master, in order to avoid recurring synchronization messages every time a small change is made to a file on the asset. Whenever other agents attempt to browse or transfer the modified file, the master will send them the updated file index.

Hot Data Prefetching

A special configuration of the system can allow selected assets, some of which may be equipped with a file browser, to keep the most updated versions of files created, moved or updated on the system in the last days. This operation is called Hot Data Pre-fetching (HDP). The collection of assets, number of days and file types parameters can be configured at the User Profile. For that end, the master itself will also keep an HDP depository (HDPD) for each user. The pre-fetch operation itself will be done over the least costly connection (preferably LAN or WIFI) to the configured device from one of the closest assets or the master HDPD. The pre-fetching operation may be queued as long as the device is disconnected or is connected through an expensive media such as GSM. The operation is resumed when a low cost connection is detected (e.g. WIFI, LAN) either with other assets or with the center.

File De-Duplication

Each agent is responsible for file de-duplication. After a file is modified or created on an asset, the asset's agent performs a chunking and signature operation, the modification of the file metadata and corresponding updates of the file's entry in the CT and LFMD and the necessary directory and file indexes, and updates the master with the change. The center records the availability of individual chunks at the assets and can conduct a direct transfer of individual chunks from one asset to a second one. Most updated chunks maybe stored at the master itself or at the corresponding cloud storage.

File Backup

An example of a method for backup of files is illustrated in FIG. 23. Each file and folder may have its own backup policy. A backup policy specifies the time interval between backups (using a backup time counter for each file), and what type of network should be used for backup, since some types of network (e.g. 3G) might be too expensive and limited in bandwidth for backups. Each agent has its backup destination for the directory rooted at that device, which is itself an asset that contains a backup storage service. Each agent may have a Backup Table (BT) which tracks files that have been modified and require a backup. The agent periodically checks the BT and chooses files to backup according to their policies. In order to back up a file, the agent sends a backup request to its backup destination that includes the list of chunks associated with each file. It then transfers the file to the backup destination, eliminating the transmission of unnecessary chunks. After it finishes sending the file, it removes the file entry from the BT.

The master is responsible for issuing and changing the backup destinations of all of the agents in the system according to a central user preference configuration.

FIG. 13 illustrates the following sequence of stages:

The master checks (2305) a file backup policy that determines that file needs to be backed up from asset that holds most updated version of file.

Once an agent connects (2310) with master, the master requests the agent to perform file metadata synchronization.

The agent, in response sends (2315) a file index.

The master (2320) determines chunks that should be backed up.

The master requests from the agent relevant file chunks (to be backed up) 2325.

The agent sends (2330) the relevant file chunks to the master (for backup).

The master acknowledges the receipt of the file portions (2335).

The agent updates its LNST (to indicate that file portions were back-up) 2340.

The master sends chunks to backup server, reset file backup timer, update agent file map entries in file Update LNST (2350).

Agent Download and Registration

Agents may be installed on physical assets manually or using remote application installation, or using an automatic application update. Alternatively, the agent can be downloaded by the user from a web agent download center or an app download site which is available to that asset through an online market, an email message or a webpage.

When a new agent enters the system, it can register itself with the master. It sends an agent registration message to the master, with its ID and its network status. The master then creates a new entry in the NST and sends an acknowledgement to the agent. The agent then scans its asset's file directory, and sends the master its local LFMD and file and directory indexes. The master acknowledges the agent's message, and adds the appropriate entries to its FMD and updates its file and directory indexes.

User Profile

The User Profile (UP) is a unique webpage for each user. The UP stores information about the user's assets and settings. In order to access online web accounts, VDFS requires the user's login information to each of the websites. The user maintains a list of active web accounts and their associated login information (user names and password) in the UP. In addition, the UP enables users to configure different VDFS settings, including HDP (i.e. the types of files the user wishes to access as 'hot data' and the length of time files are considered as 'hot') and privacy settings (certain files on different assets can be designated as private and are ignored by VDFS).

Data Policy Profile

The Data Policy Profile (DPP) provides an interface for VDFS administrators to set system-wide security and backup policies, and track and monitor the state of data across multiple assets. Policies are set in the granularity of files, directories or entire directory trees and can apply to all assets or to a group of assets (like all mobile devices). The master is responsible for executing the policies specified by the DPP. Each file's security and backup policies are contained in the directory and file index. Security and backup policies for a specific file or the content of a certain folder or directory sub-trees include but are not limited to: (i) File must backed up at a file server; (ii) setting a Time limit on the backup operation; (iii) File must be encrypted on certain assets.

Copy, move and delete procedures can include (i) file can't be copied to a certain asset; (ii) Only one copy of the file can exist at any given time; (iii) File cannot be erased, replicated, copied or moved; (iv) Log any access to and modification of the directory or file at the Master.

File Wipe-Out Policy a. In case the device does not authenticate with the Master for an extended period of time b. When repeated suspicious activity is detected on device In case VDFS memory exceeds the quota, files which are not hot in marked directories may be removed from the device cache.

The master is responsible for maintaining the policies for each directory and file. VDFS administrators can create customized policies according to their preferences. Every time an asset tries to perform an operation (i.e. file read, write, copy, transfer, backup) on a file, it first checks the security and backup policy of the file, and enforces the policy accordingly. Different assets could have different policies for the same files.

The master uses a Policy Translation Table (PTT) to translate system-wide DPP policies to policies for individual files on each agent. For example, a DPP security policy could require that specific sensitive files must be encrypted only if they stored on mobile devices. When the master sends any mobile device the file index for these sensitive files, it will use a security policy ID that specifies that these files must be encrypted. If a non-mobile device (e.g. PC) tries access the files, the master will send it file indexes with a security policy that does not require encryption.

In addition, each file index has an access control list, which specifies which user group, user or asset may read, write or copy the file. The DPP provides an interface for managing these user groups. The DPP allows administrators to access all the file and directory metadata across all users in the system.

Tracking and Logging

The DPP allows DVFS administrators to track and or log all activity on specific files or directories across all assets and users. If administrators choose to log all activity associated with specific files, whenever any operation is performed on the file on any asset in the system, the agent sends a log message to the master, which provides the details of the operation, including and not limited to the type of operation, time of the operation, asset ID, user ID, number of bytes written. The master then logs these details in a file specific log.

If the DPP specifies that all operations on a given directory or file should be tracked, the agents and master log all operations on the file, and the master notifies the DPP whenever there are updates to the log.

Either one of the mentioned above methods can be executed by a processor that may executed instructions (code) stored in non-transitory computer readable medium.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for operating a web-based operating system, the method comprises:
    maintaining, by a master server located in a cloud computing environment, a metadata data structure that comprises metadata that comprises state information about states of multiple assets of at least one user; and
    running applications, by the master server, across multiple assets;
    wherein a running of an application comprises:
        communicating with multiple assets that are coupled to the cloud computing environment or are hosted by a device that is either coupled to the cloud computing environment or belongs to the cloud computing environment; and
        managing a state of at least a first asset according to (a) metadata of the metadata data structure that is associated with the first asset and (b) metadata of the metadata data structure associated with a second asset.

2. The method according to claim 1, wherein the asset is selected from a group consisting of a smart phone, a mobile phone, a tablet, a laptop, a desktop, a personal data accessory, a camera, a television, a home entertainment device, a home gaming device, a home appliance, a home security system, fire control systems, a home irrigation system, home lighting control, a climate control system, a water heating system, an electrical control device, a movement sensor, a heat sensor, a personal web account, an email account, a user on-line calendar, a user on-line contact list, a social network account, a web document account, a user health account, a software as a service account, an enterprise internal file system, a user related storage at the master center and a user profile account at the master center.

3. The method according to claim 1, wherein the managing of the state of the at least first asset is further responsive to application related external information.

4. The method according to claim 1, comprising using a first asset as a remote control for at least one other asset; wherein the method comprises sending to the master server the first asset's state information that comprises commands and changing, by the master server, a state of other assets in response to the commands.

5. The method according to claim 1, wherein the managing of the state of assets comprises transferring information through a direct network connection from a first asset to one or more other assets.

6. A method for managing a virtual distributed file system, the method comprising:
    maintaining, by a master server located in a cloud computing environment, a metadata data structure that comprises metadata that comprises locations of the most updated versions of multiple files and directories; wherein at least one file or directory is rooted at a user device that is coupled to the cloud computing environment; and managing, by the master server, transaction of file portions between user assets based on metadata stored in the metadata data structure about the file and directory.

7. The method according to claim 6, wherein at least one user asset is selected from a group comprising a smart phone, a mobile phone, a tablet, a laptop, a desktop, a personal data accessory, a home entertainment device, a home gaming device, a home appliance, a portable memory device, a personal web account, an email account, a social network account, a web storage, a network backup storage, a web document account, a software as a service account, an enterprise internal file system, an enterprise application account and file storage located at the master server.

8. The method according to claim 6, wherein the metadata of the file includes a description of a native file system of an asset on which the said file resides, a name of the asset, a type of the asset, an identity and structure of a directory for which the file belongs, absolute or relative location of the file in the directory, a time of a last change of the file, a file version number, a file description, a file encryption key, a list of file chunks composing the file, a position of the file chunks in the file.

9. The method according to claim 6, wherein the user asset stores at least a part of the metadata data structure that is associated with the user; wherein the method comprises synchronizing at least part of the metadata structure associated with the user with the master server upon local and remote file and directory metadata changes.

10. The method according to claim 6, comprising: receiving by the master server a request from a first asset to transfer a file to the first asset; determining by the master server at least one other asset from which missing file chunks not stored in the first asset are to be transferred based upon network connectivity metadata, indicative of a quality of communication between the first asset and the at least one other asset.

11. The method according to claim 6, comprising: receiving a request to transfer a file from a first asset to a second asset; determining whether the file should be transferred through the master server or not, based upon network connectivity metadata, indicative of an available direct communication between the first and second assets.

12. The method according to claim 6, wherein at least one asset is an account of a user in a remote web service and wherein the metadata data structure comprises metadata about files accessible through the web account of the user, wherein the metadata structure comprises a representation of files accessible through the web account of the user in a form of a virtual file directory structure.

13. The method according to claim 12, wherein at least one directory of the virtual directory structure describes an email account of a user, wherein the virtual file directory structure comprises metadata of at least one email attachment, wherein the metadata associated with said attachment includes the standard fields of the email message.

14. The method according to claim 6, comprising: instructing a first user asset to fetch at least one file chunk from the master server or another user asset in a response to an indication that the first user asset network connectivity has changed.

15. The method according to claim 6, comprising instructing a first user asset to fetch at least one file chunk of a recently updated file from the master server or another user asset in a response to a recent file update and according to the first user asset's network connectivity speed.

16. The method according to claim 6, comprising instructing a first user asset to fetch at least one file chunk of a recently updated file from the master server or another user asset in a response to a file or directory related command on a second user asset and according to the first user asset's network connectivity speed.

17. A computer program product that comprises a non-transitory computer readable medium that stores instructions for:
maintaining, by a master server located in a cloud computing environment, a metadata data structure that comprises metadata that comprises state information about a state of multiple assets of at least one user;
running applications, by the master server, across multiple assets;
wherein a running of an application comprises:
communicating with multiple assets that are coupled to the cloud computing environment or are hosted by a device that is either coupled to the cloud computing environment or belongs to the cloud computing environment; and
managing a state of at least a first asset according to (a) metadata of the metadata data structure that is associated with the first asset and (b) metadata of the metadata data structure associated with a second asset.

18. The computer program product according to claim 17 wherein the asset is selected from a group consisting of a smart phone, a mobile phone, a tablet, a laptop, a desktop, a personal data accessory, a camera, a television, a home entertainment device, a home gaming device, a home appliance, a home security system, fire control systems, a home irrigation system, home lighting control, a climate control system, a water heating system, an electrical control device, a movement sensor, a heat sensor, a personal web account, an email account, a user on-line calendar, a user on-line contact list, a social network account, a web document account, a user health account, a software as a service account, an enterprise internal file system, a user related storage at the master center and a user profile account at the master center.

19. The computer program product according to claim 17, wherein the managing of the state of the at least first asset is further responsive to application related external information.

20. The computer program product according to claim 17 that stores instructions for using a first asset as a remote control for at least one other asset; wherein the method comprises sending to the master server the first asset's state information that comprises commands and changing, by the master server, a state of other assets in response to the commands.

21. The computer program product according to claim 17, wherein the managing of the state of assets comprises transferring information through a direct network connection from a first asset to one or more other assets.

22. A computer program product that comprises a non-transitory computer readable medium that stores instructions for:
maintaining, by a master server located in a cloud computing environment, a metadata data structure that comprises metadata that comprises locations of the most updated versions of multiple files and directories; wherein at least one file or directory is rooted at a user device that is coupled to the cloud computing environment; and managing, by the master server, transaction of file portions between user assets based on metadata stored in the metadata data structure about the file and directory.

23. The computer program product according to claim 22, wherein at least one user asset is selected from a group comprising a smart phone, a mobile phone, a tablet, a laptop, a desktop, a personal data accessory, a home entertainment device, a home gaming device, a home appliance, a portable memory device, a personal web account, an email account, a social network account, a web storage, a network backup storage, a web document account, a software as a service account, an enterprise internal file system, an enterprise application account and file storage located at the master server.

24. The computer program product according to claim 22, wherein the metadata of the file includes a description of a native file system of an asset on which the said file resides, a name of the asset, a type of the asset, an identity and structure of a directory for which the file belongs, absolute or relative location of the file in the directory, a time of a last change of the file, a file version number, a file description, a file encryption key, a list of file chunks composing the file, a position of the file chunks in the file.

25. The computer program product according to claim 22, wherein the user asset stores at least a part of the metadata data structure that is associated with the user; wherein the method comprises synchronizing at least part of the metadata structure associated with the user with the master server upon local and remote file and directory metadata changes.

26. The computer program product according to claim 22 that stores instructions for receiving a request to transfer a file to a first asset; determining at least one other asset from which missing file chunks not stored at the first asset are to be transferred based upon network connectivity metadata, indicative of a quality of communication between the first asset and the at least one other asset.

27. The computer program product according to claim 22 that stores instructions for receiving a request to transfer a file from a first asset to a second asset; determining whether the file should be transferred through the master server or not, based upon network connectivity metadata, indicative of an available direct communication between the first and second assets.

28. The computer program product according to claim 22, wherein at least one asset is an account of a user in a remote web service and wherein the metadata data structure comprises metadata about files accessible through the web account of the user, wherein the metadata structure comprises a representation of files accessible through the web account of the user in a form of a virtual file directory structure.

29. The computer program product according to claim 28, wherein at least one directory of the virtual directory structure describes an email account of a user, wherein the virtual file directory structure comprises metadata of at least one email attachment, wherein the metadata associated with said attachment includes the standard fields of the email message.

30. The computer program product according to claim 28 that stores instructions for: instructing a first user asset to send to another user asset or to the master server at least one file chunk in a response to an indication that the first user asset network connectivity has changed.

31. The computer program product according to claim 28 that stores instructions for instructing a first user asset to send to another user asset or to the master server at least one file chunk of a recently updated file in a response to a recent file update and according to the first user asset's network connectivity speed.

32. The computer program product according to claim 28 that stores instructions for instructing a first user asset to send to another user asset or to the master server at least one file chunk of a recently updated file in a response to a file or directory related command on a second user asset and according to the first user asset's network connectivity speed.

* * * * *